(12) United States Patent
Pham et al.

(10) Patent No.: US 11,821,869 B2
(45) Date of Patent: Nov. 21, 2023

(54) METHOD AND APPARATUS FOR STATIONARY ELECTROMAGNETIC INSPECTION (EMI) WITH ORTHOGONAL MAGNETIZERS

(71) Applicants: Quang Hong Pham, Ba Ria (VN); Binh Minh Quoc Phan, Ba Ria (VN); Sy Van Le, Ba Ria (VN); Hung Minh Vu, Ba Ria (VN); Khuong Ngoc Nguyen, Ba Ria (VN); Hung Quang Tran, Ba Ria (VN)

(72) Inventors: Quang Hong Pham, Ba Ria (VN); Binh Minh Quoc Phan, Ba Ria (VN); Sy Van Le, Ba Ria (VN); Hung Minh Vu, Ba Ria (VN); Khuong Ngoc Nguyen, Ba Ria (VN); Hung Quang Tran, Ba Ria (VN)

(73) Assignee: Petroleum Vietnam University, Ba Ria Vung Tau (VN)

( * ) Notice: Subject to any disclaimer, the term of this patent is extended or adjusted under 35 U.S.C. 154(b) by 38 days.

(21) Appl. No.: 17/547,348

(22) Filed: Dec. 10, 2021

(65) Prior Publication Data
US 2023/0184717 A1  Jun. 15, 2023

(51) Int. Cl.
*G01N 27/82* (2006.01)

(52) U.S. Cl.
CPC ................................. *G01N 27/82* (2013.01)

(58) Field of Classification Search
CPC ........................................................ G01N 27/08
See application file for complete search history.

(56) References Cited

U.S. PATENT DOCUMENTS

| | | | | |
|---|---|---|---|---|
| 3,900,146 | A | * 8/1975 | Fowler | F16L 1/026 228/103 |
| 5,007,291 | A | * 4/1991 | Walters | G01N 29/223 226/176 |
| 11,402,351 | B1 | * 8/2022 | Tolman | G01N 27/904 |
| 2007/0222438 | A1 | * 9/2007 | Reeves | G01N 27/82 324/228 |
| 2020/0254989 | A1 | * 8/2020 | Kawakami | B60T 8/17 |
| 2022/0290967 | A1 | * 9/2022 | Reeves | G01N 29/27 |

* cited by examiner

Primary Examiner — Dominic E Hawkins

(57) ABSTRACT

A stationary electromagnetic inspection (EMI) apparatus and method are disclosed which includes a base; a plurality of hydraulic clamping rollers, connected to that base, operable to move a test pipe forward and backward in a translational direction only; a transverse flaw detection module comprising a plurality of sensor arms each equipped with rows of magnetic sensor arrays arranged in a stagger manner along an axis of a test pipe; and a longitudinal flaw detection module comprising magnetizers and magnetic sensor arrays each respectively arranged orthogonal to one another.

20 Claims, 16 Drawing Sheets

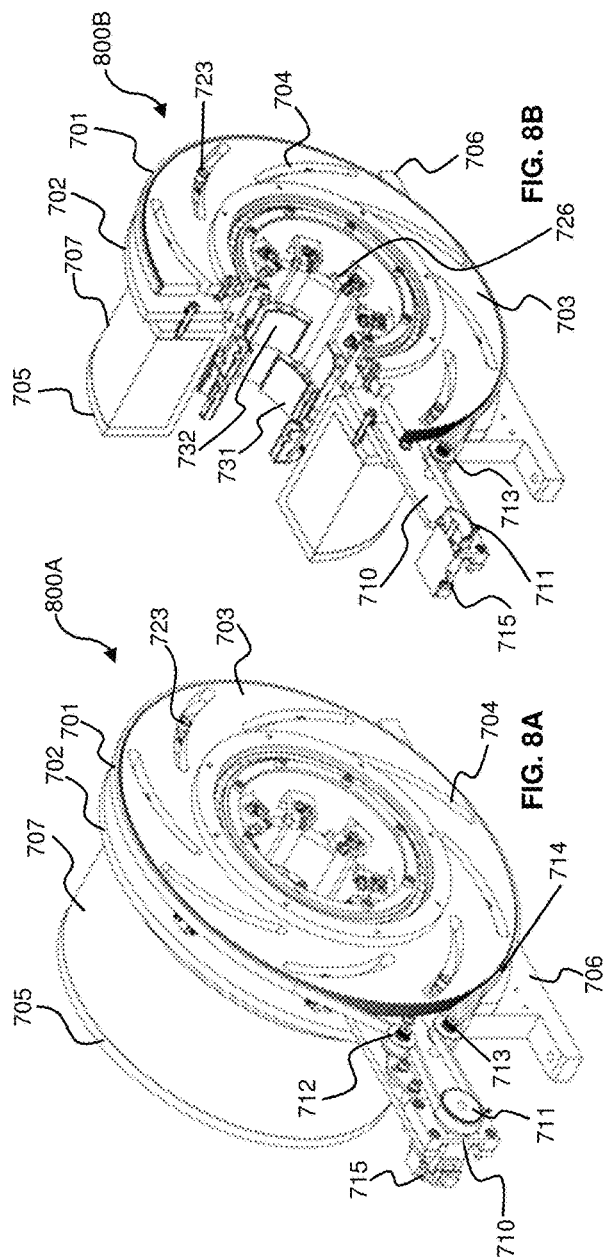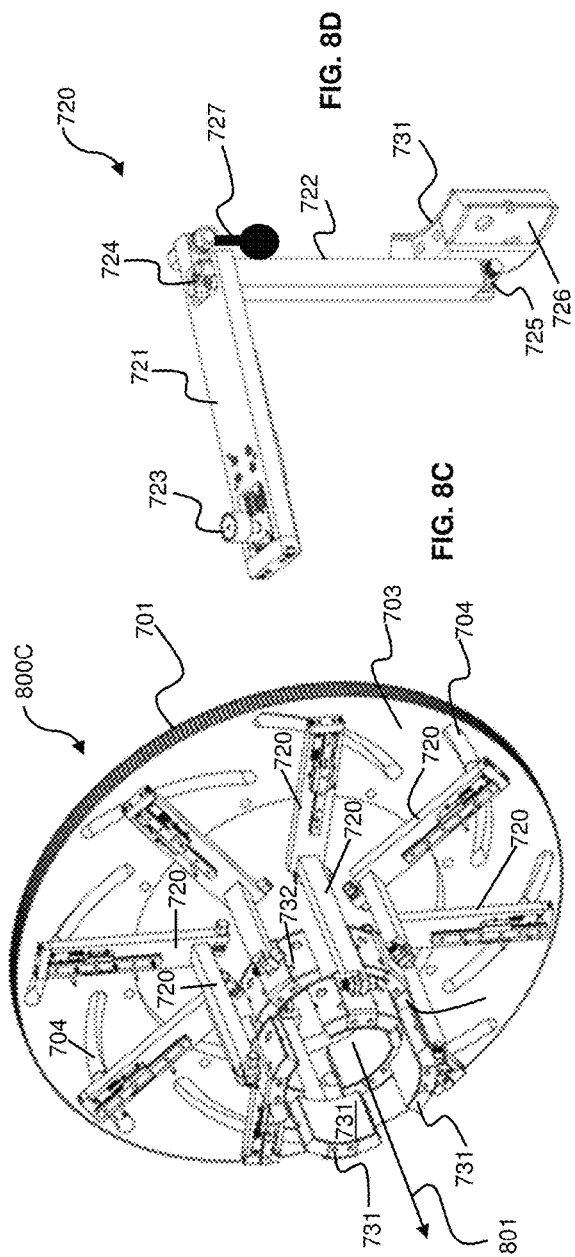

METHOD AND APPARATUS FOR STATIONARY ELECTROMAGNETIC INSPECTION (EMI) WITH ORTHOGONAL MAGNETIZERS

FIELD OF THE INVENTION

The present invention relates to nondestructive magnetic testing based on magnetic flux leakage method. More particularly, this invention relates to a method and apparatus for stationary electromagnetic inspection (EMI) detection of surface defects in tubular products.

BACKGROUND OF THE INVENTION

One of the most popular inspection methods in the field of oil and gas industry is the magnetic flux leakage (MFL) technique because it has demonstrated the ability to accurately assess the geometry of a surface breaking defect in a ferromagnetic material through nondestructive testing [1]. In the MFL inspection, under an applied magnetic field, an amount of magnetic flux is leaked out from the surface of the ferromagnetic material where there is a metal loss or a defect because the magnetic permeability of air is lower than that of ferromagnetic material. Using magnetic sensors this magnetic leakage field can be measured, which reflects the condition of the steel pipes. There has been a lot of work on the theory of the method as well as details of MFL technical problems. In a recent work, the importance of the magnetizing field on the magnetic flux leakage signal has been reported [2]. For the large diameters steel pipes (more than 6 inches), especially in case of pipelines buried underground, the commonly used MFL technique is the in-line inspection (ILI), [3] i.e., the MFL apparatus examines pipes from their inner surface. For the pipes with small, straight, and disjointed characteristics, the MFL apparatus commonly called stationary electromagnetic inspection (EMI) exams the condition of pipes from their outer surface [4].

FIG. 1 shows a conventional EMI system 100. To obtain good MFL signals, the magnetization direction should be perpendicular to the direction of defects. Therefore, conventional EMI apparatus 100 includes two types of magnetizers based on the alignment of the magnetizing field. Namely, axial magnetizer 106 is used to detect transverse flaws 112, and a circumferential magnetizer 102 is used to detect longitudinal flaws 111. In the transverse flaw inspection, it is easy to generate a high-density uniform axial magnetic flux 114 in the full circumference of pipe wall with an insert coil 105. An array of inspection probes 106 may scan and detect the full circumference of a tube 101 when tube 101 axially translating in direction 141 relative to insert coil 105 and inspection probe array 106. In the longitudinal flaw inspection, prior-art EMI apparatus 100 includes three main components: a couples of magnetic pole shoes 104 for generating a magnetic field 113 that is perpendicular to tube 101; a magnetic yoke 102 for guiding the magnetic field 113; and magnetic probes 103 located in the middle of two pole shoes 102 for measuring MFL signals 131 from a test pipe 101. To accomplish full scanning of the pipe wall for longitudinal defects 111, either tube 101 moves through the inspection apparatus either in helical motion 121 or in a linear motion 141. Alternatively, two pole shoes 104 magnetic probes 103 can be rotated around its axis in direction 112 while tube 101 moves linearly in direction 141. These mechanisms 121 and 141 correspond to the fixed or rotated around tube 101 of the magnetizer 102 and inspection probes 103. Both mechanisms of convention operation have the greatest disadvantage of limiting the speed of testing. In addition, these mechanisms consume more power and require regular replacement of parts such as ball bearings and carbon brushes.

Therefore, there is a need for as stationary EMI apparatus for testing pipes, tubes, and tubular products that is stable and do not wobble during the tests.

There is a need for an EMI apparatus that is cost-effective, durable, and easy to maintenance without regular replacement of parts.

There is a need for an EMI apparatus that consumes less power and produces accurate and consistent detections of flaws.

There is a need for an EMI apparatus that only needs to move the test pipe only linearly so that the speed of the test is significantly improved.

The apparatus of the present invention meets the above needs.

SUMMARY OF THE INVENTION

The present invention has been made in view of the aforementioned circumstances, and therefore, an object of the present invention is to provide a stationary electromagnetic inspection (EMI) apparatus which includes a base; a plurality of clamping rollers, connected to that base, operable to move a test pipe forward and backward in a translational direction only; a transverse flaw detection module comprising a plurality of sensor arms each equipped with rows of magnetic sensor arrays arranged in a stagger manner along an axis of the test pipe; and a longitudinal flaw detection module comprising magnetizers arranged an orthogonal position relative to one another.

Another object of the present invention is to provide a method of inspecting a test pipe which comprises the steps of (a) detecting longitudinal defects on a test pipe using a longitudinal defect detecting module characterized in having magnetizers placed orthogonal to one another and configured to generate transverse magnetic fields that cover the entire circumference without rotating the test pipe; (b) detecting transverse defects on the test pipe using a transverse flaw detection module which is capable of adjusting the positions of sensor arrays at a constant distance and substantially parallel to an outer surface of the test pipe; (c) detecting variations in the thickness of the test pipe using magnetic density method; and (d) moving the test pipe in a translational direction only as the defects are inspected from beginning to end of the test pipe.

Another object of the present invention is to provide a method of fabricating a stationary electromagnetic inspection (EMI) apparatus which includes (a) preparing a transverse defect detecting module operable to generate longitudinal magnetic fields configured to detect transverse defects in a test pipe; (b) preparing a longitudinal defect defecting module comprising magnetizers placed orthogonal to one another which is configured to generate transverse magnetic fields that cover the entire circumference without having to rotate the test pipe; (c) preparing a thickness monitoring module operable to monitor thickness variations in the test pipe.

Another object of the present invention is to provide an EMI apparatus for testing pipes, tubes, and tubular products that is stable and do not wobble during the tests.

Another object of the present invention is to provide an EMI apparatus that is cost-effective, durable, and easy to maintenance without regular replacement of parts.

Another object of the present invention is to provide an EMI apparatus that is power efficient and accurate in flaw detections.

Another object of the present invention is to provide an EMI apparatus that only needs to move the test pipe linearly so that the speed of the test is significantly improved.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 8A is a 3D perspective diagram illustrating a side view of transverse flaw detection module with a servo motor, Archimedean helical grooves, and senor arms configured to precisely control the distance between an array of sensors and the outer surface of the test pipe in accordance with an exemplary embodiment of the present invention;

FIG. 8B is a 3D cut-away diagram of the stationary transverse flaw detection module that shows the arrays of sensors arranged in stagger manner to one another in accordance with an exemplary embodiment of the present invention;

FIG. 8C is a 3D rear view of the disc rotor showing the stagger arrangement of the sensor arms in connections with the Archimedes helical grooves in accordance with an exemplary embodiment of the present invention;

FIG. 8D is a 3D rear diagram of the sensor arms connected to a shoe pad in accordance with an exemplary embodiment of the present invention;

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
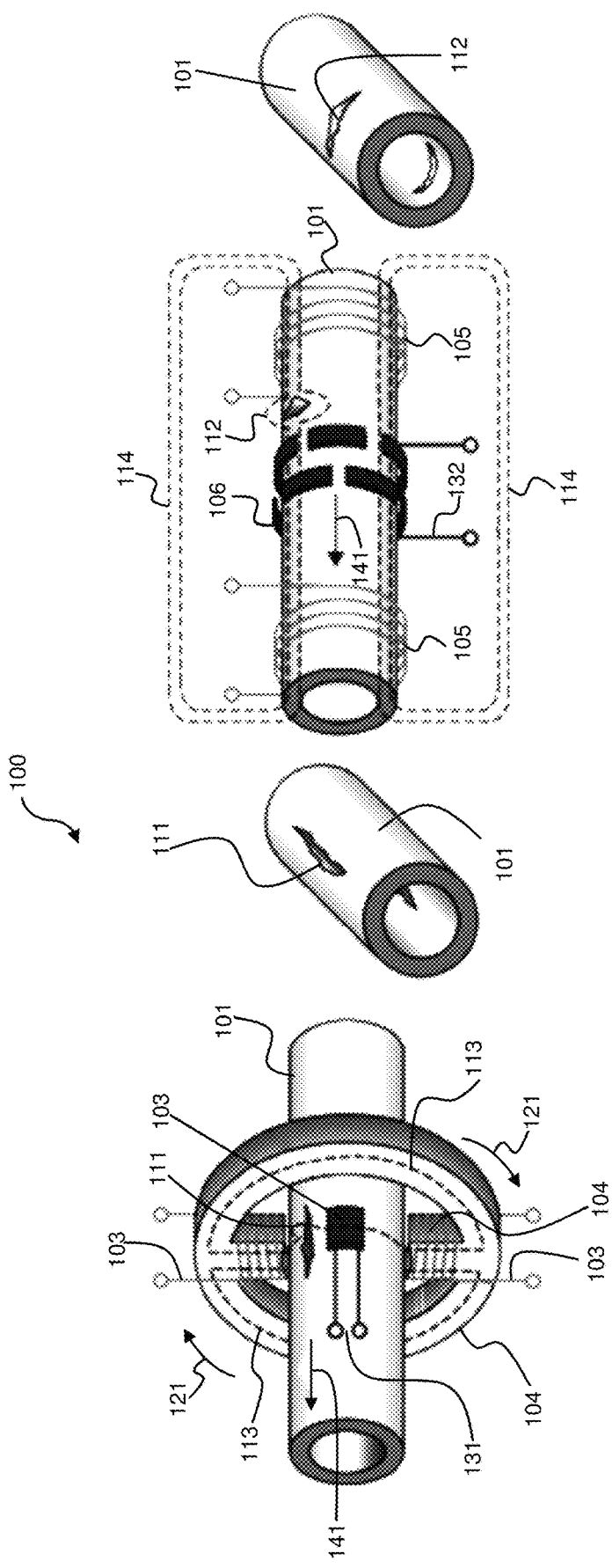
FIG. 1 is a prior-art electromagnetic inspection (EMI) apparatus that requires rotational motions of either the test pipe or the magnetizing probes which results in the wobbling and destabilizing of the test pipe and consequently consuming a lot of power and regular replacement of parts.
Figure 2:
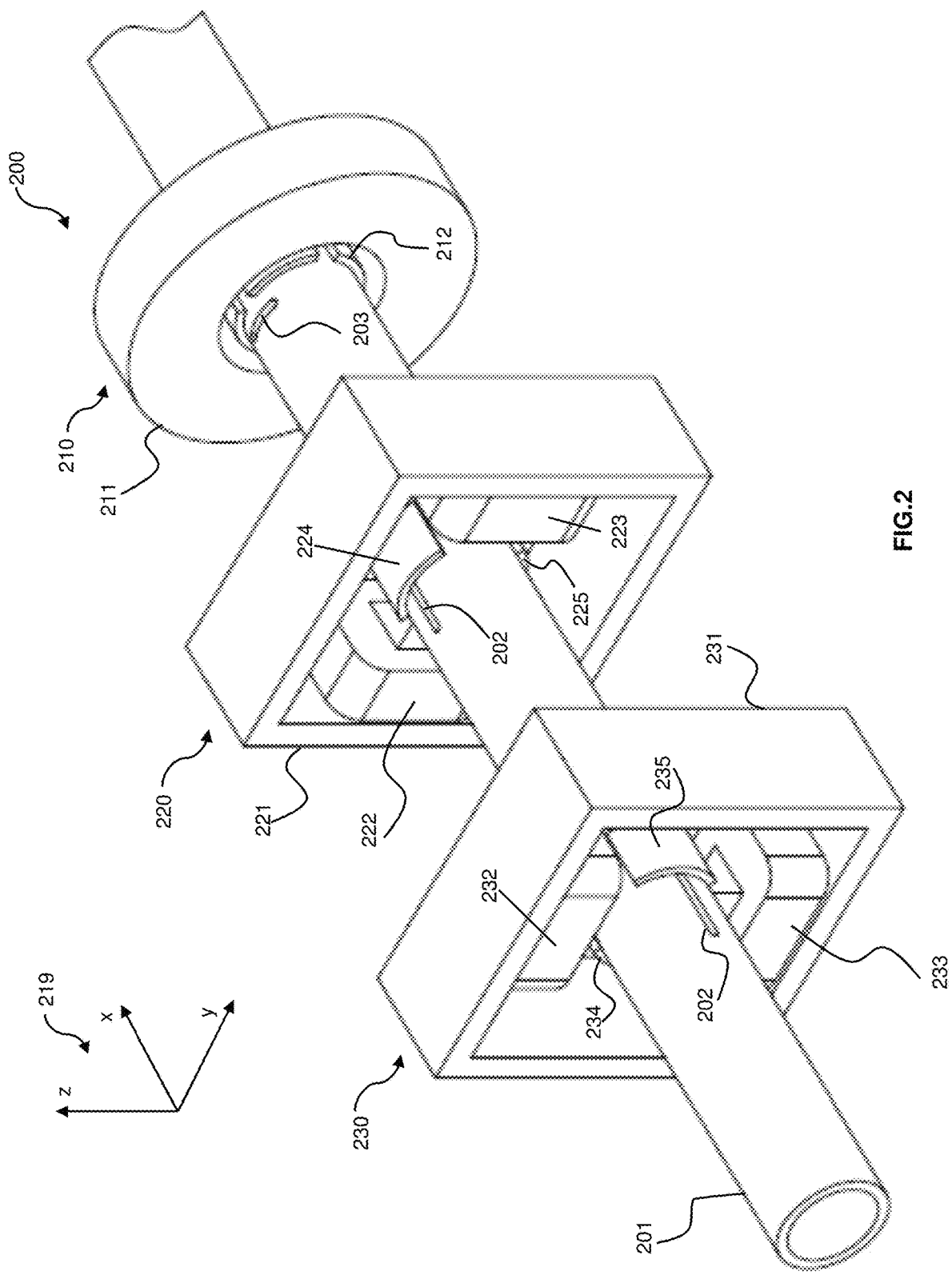
FIG. 2 is a conceptual diagram of the stationary EMI apparatus that only requires linear motion of the test pipe during the test period in accordance with an exemplary embodiment of the present invention.

Now referring to FIG. 2, a stationary electromagnetic inspection (EMI) apparatus 200 ("stationary EMI apparatus 200") using non-destructive test (NDT) and electromagnetic inspection (EMI) scanning method in accordance with an exemplary embodiment of the present invention is illustrated. In various embodiments, stationary EMI apparatus 200 includes a transverse flaw detection module 210 with an axial magnetizer 211 and an array of inspection probes 212 designed to detect all transverse flaws 203 on test pipe 201. Stationary EMI apparatus 200 also includes a first longitudinal flaw detection modules 220 placed horizontally adjacent to a second longitudinal flaw detection module 230 designed to detect all longitudinal flaws 202 on test pipe 201. It is noted that longitudinal flaws 202 and transverse flaws 203 that can be detected by stationary EMI apparatus 200 of the present invention include pin-holes, cross cracks, lamination, seam cracks, butt welds, porosity, hook cracks, lack of fusion, edge damage, burned edges, and open seams. These flaws can appear in the interior, middle, and/or exterior surfaces of test pipe 201. In addition, stationary EMI apparatus 200 described herein and later in FIG. 3-FIG. 15 is capable of detecting and skipping tool joints at the end of test pipe 201.

First longitudinal flaw detection module 220 includes a first frame 221 enclosing a first circumferential magnetizer 222, a second circumferential magnetizer 223, a first magnetic sensor array 224, and a second magnetic sensor array 225. Similarly, second longitudinal flaw detection module 230 includes a second frame 231 enclosing a third circumferential magnetizer 232, a fourth circumferential magnetizer 233, a third magnetic sensor array 234, and a fourth magnetic sensor array 235. In many advantageous embodiments of the present invention, first circumferential magnetizer 222 is positioned opposite to second circumferential magnetizer 223. Both are positioned orthogonal to third circumferential magnetizer 232 which is in opposite position to fourth circumferential magnetizer 233. This novel structure and arrangement of first to fourth circumferential magnetizers 222, 223, 232, and 233 result in the uniform distribution of the magnetic field radiating along the circumference direction of test pipe 201. Thus, neither test pipe 201 nor longitudinal flaw detection modules 220-230 have to rotate and move linearly simultaneously. With stationary EMI apparatus 200 of the present invention, test pipe 201 only needs to move linearly, resulting in many benefits and achieving the following objectives of the present invention.

(1) Stationary EMI apparatus 200 with circumferential magnetizers 222-223 and 323-323 eliminates the wobbling effects caused by the rotation of either test pipe 201 or longitudinal flaw detection modules 220-230;

(2) Stationary EMI apparatus 200 to locate circumferential defects on test pipe 201; and (3) Stationary EMI apparatus 200 lasts longer without the need to replace constituent parts that are prone to be damaged by the rotation of the heavy longitudinal flaw detection modules; and (4) Stationary EMI apparatus 200 is cost-effective to build and easy to operate without the need of frequent maintenance.

Now FIG. 3 to FIG. 13 describe further details and structure of stationary EMI apparatus 200 that explain the operation principle and achieve the objectives of the present invention.

Figure 3:
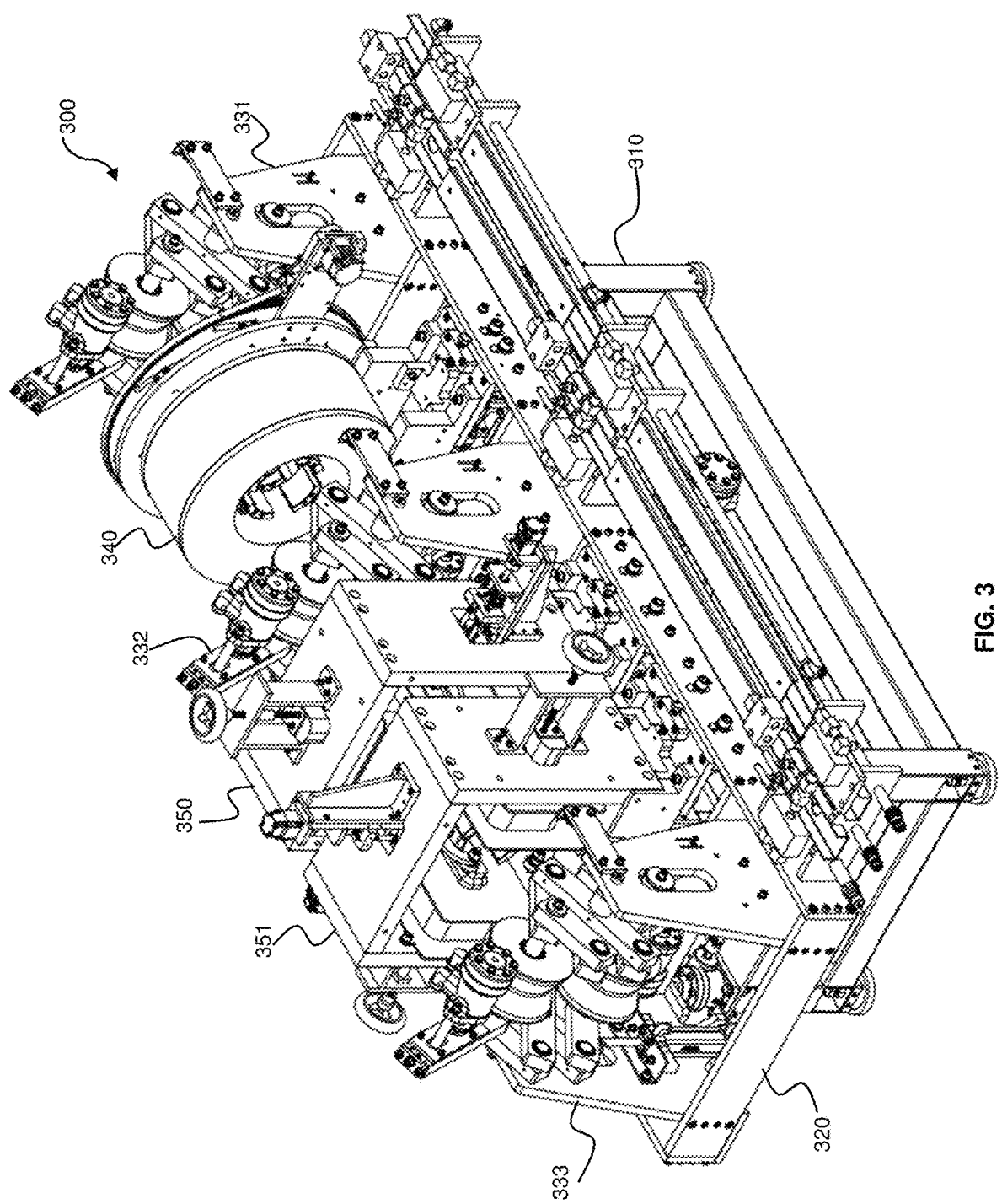
FIG. 3 is a 3D perspective diagram showing an actual mechanical structure of the stationary EMI apparatus in accordance with an exemplary embodiment of the present invention.

Next, referring to FIG. 3, a 3D perspective diagram showing a complete mechanical structure of stationary EMI apparatus 300 in accordance with an exemplary embodiment of the present invention is illustrated. A base 310 and an adapting a bed frame 320 are used to support stationary EMI apparatus 300. The detailed structures of base 310 and adapting bed frame 320 are described in FIG. 4. In various embodiments of the present invention, stationary EMI apparatus 300 includes an array of hydraulic clamping rollers 331, 332, and 333 that are placed intermittently between a transverse flaw detection module 340, a first longitudinal flaw detection module 350, and a second longitudinal flaw detection module 351. Array of hydraulic clamping rollers 331-333 are designed to move test pipe 201 in linear direction along the x-axis of Cartesian coordinate 219. It is noted that first longitudinal flaw detection module 350 is juxtaposed to second longitudinal flaw detection module 351.

Figure 4:
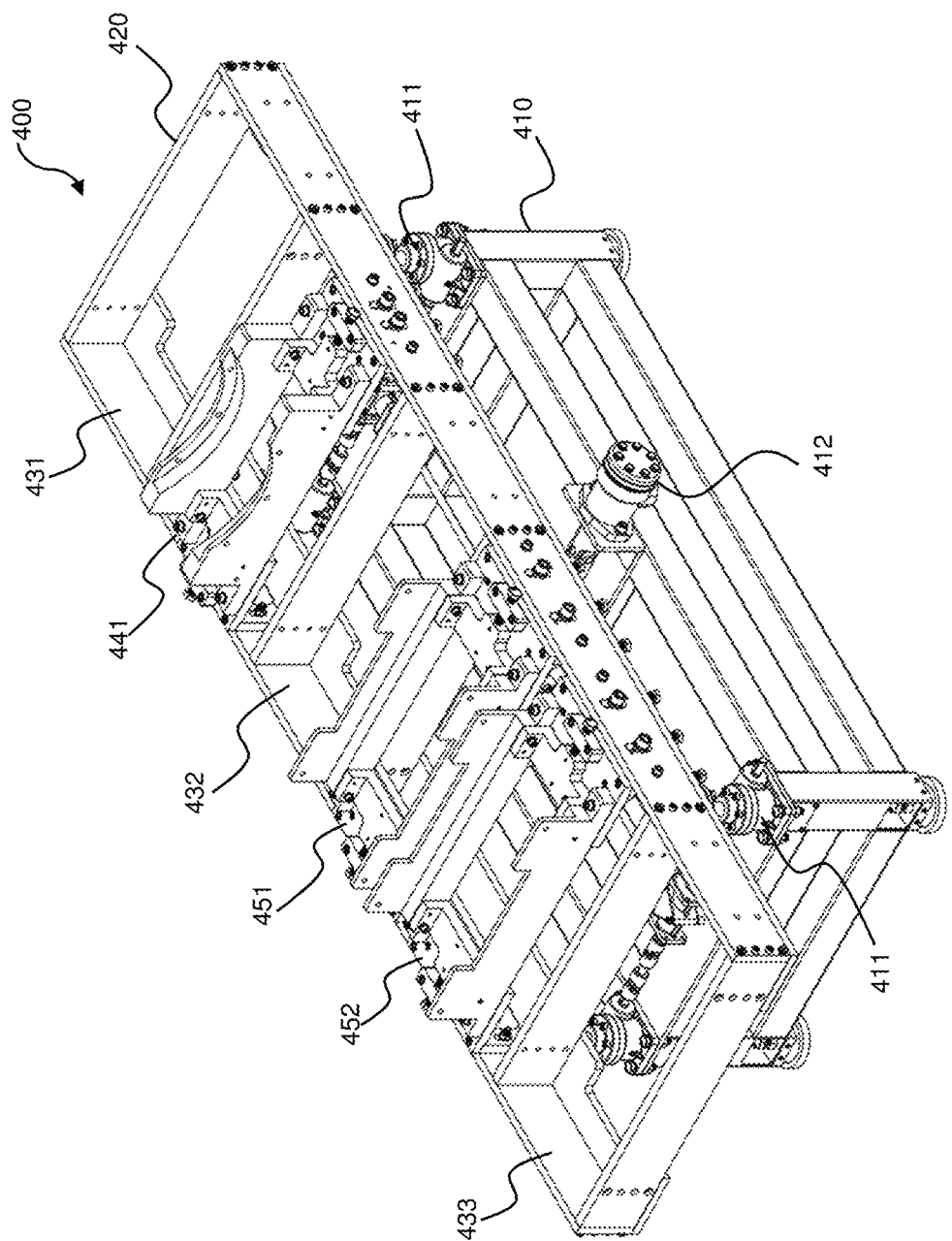
FIG. 4 is a 3D perspective diagram of a base and an adapting bed frame in accordance with an exemplary embodiment of the present invention.

FIG. 4 is a 3D perspective diagram of base connected to an adjustable bed frame 400 in accordance with an exemplary embodiment of the present invention is illustrated. In many embodiments of the present invention, a base 410 has a rectangular shape with the dimension of 0.7 m×0.6 m×2.5 m and is made up of steel or hard aluminum materials that can support more than 2 tons of weight. The height of base 410 can be adjusted by four corner hydraulic motors 411 placed at the four corners of rectangular base 410. An adjustable bed frame 420 is connected firmly atop of base 410 at four corner hydraulic motors 411. Adjustable bed frame 420 includes a first divider 431 for securing first clamping roller 331, a second divider 432 for securing second clamping roller 332, a third divider 433 for securing third hydraulic clamping roller 333, a fourth divider 441 for securing transverse flaw detection module 340, a fourth divider 451 for securing first longitudinal flaw detection module 351, and a fifth divider 452 for securing second longitudinal flaw detection module 352. Due to the weights of the above listed components, first to third hydraulic clamping rollers 331-333, transverse flaw detection module 340, first longitudinal flaw detection module 350, and second longitudinal flaw detection module 351, a middle hydraulic motor 412 are placed in the middle of base 410 to maintain the balance of stationary EMI apparatus 300 within +/−10 cm.

Figure 5:
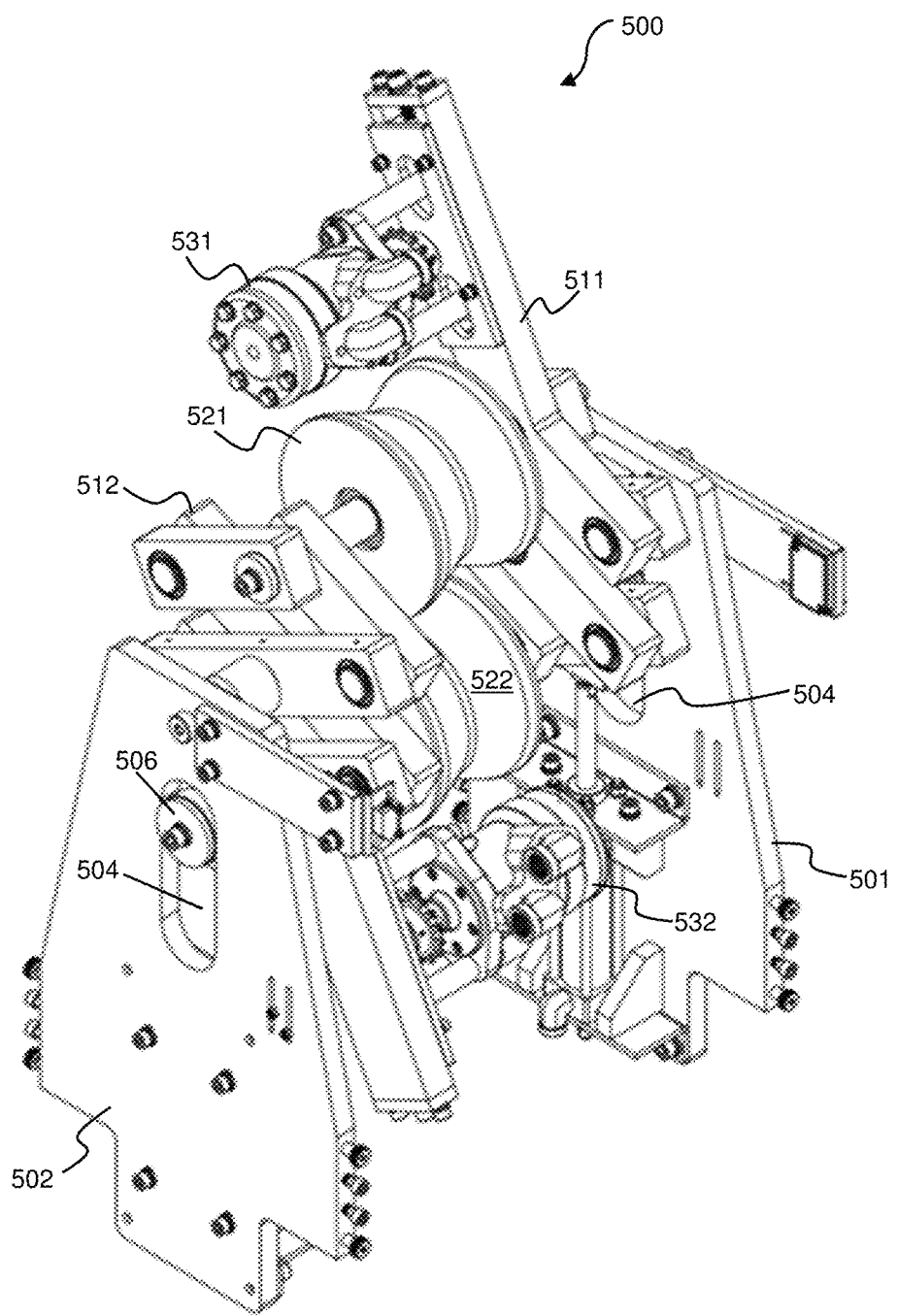
FIG. 5 is the 3D perspective diagram of a hydraulic clamping roller in accordance with an exemplary embodiment of the present invention.
Figure 6:
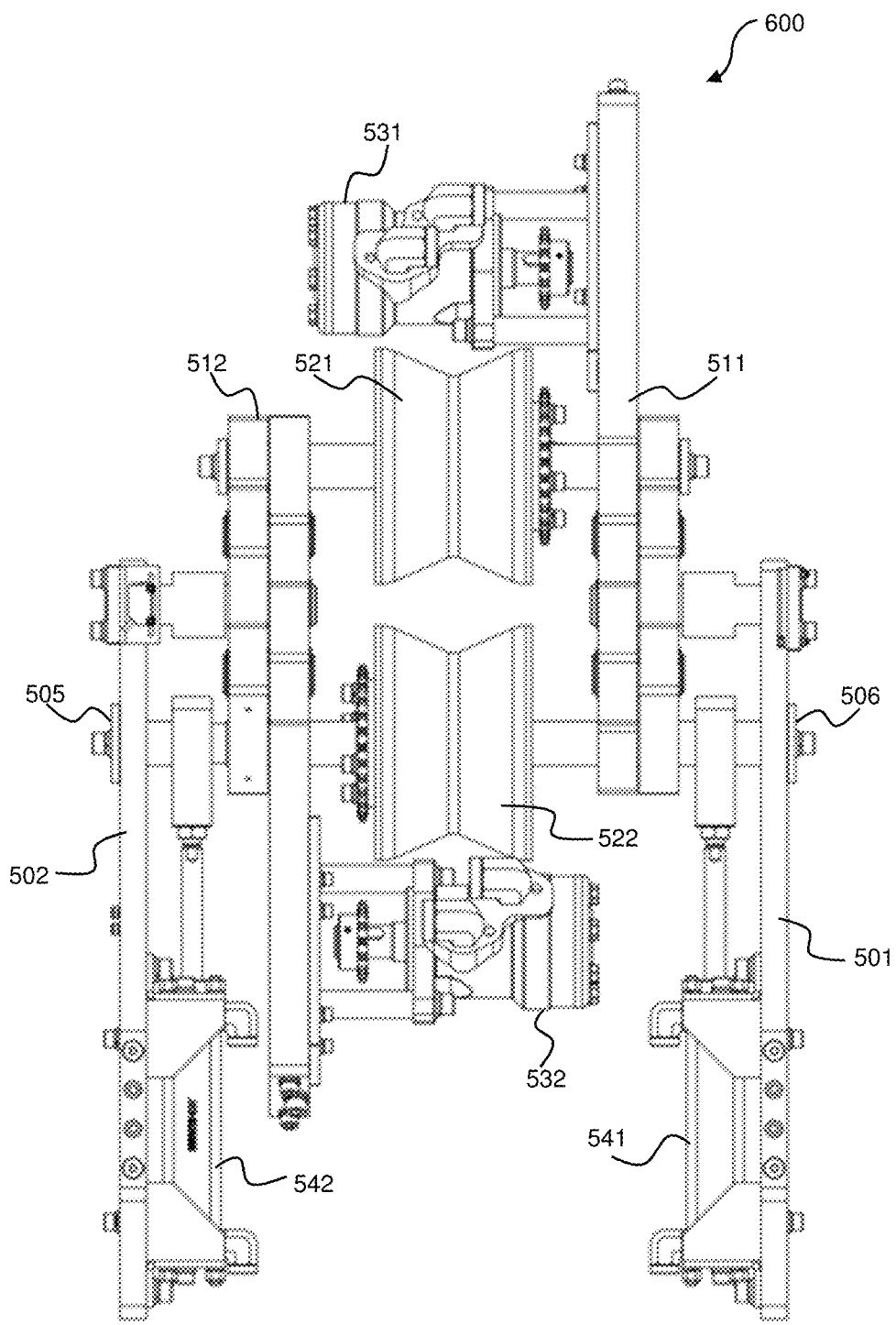
FIG. 6 is a top view 2D diagram of the hydraulic clamping roller in accordance with an exemplary embodiment of the present invention.

Next, referring to FIG. 5 and FIG. 6, first to third hydraulic clamping rollers 331-333 are described. In many embodiments of the present invention, first to third hydraulic clamping rollers 331-333 are structurally the same and placed at the front, middle, and end position between transverse flaw detection module 340 and first and second longitudinal flaw detection modules 350-351 respectively for moving test pipe 302 linearly. In FIG. 5, a 3D perspective diagram of a hydraulic clamping roller 500 in accordance with an exemplary embodiment of the present invention is illustrated. In FIG. 6, a 2D top view 600 of hydraulic clamping roller 500 is shown. Hydraulic clamping roller 500 includes a first foot stand 501 and a second foot stand 502 for fastening to first to third dividers 431, 432, and 433 respectively. First foot stand 501 is connected to a first rotating scissor extension member 511 while second foot stand 502 is connected to a second rotating scissor extension member 512. A first roller 521 is positioned above a second roller 522 and both are pivoted to first rotating scissor extension member 511 and second rotating scissor extension member 512 so that when first and second rotating scissor extension members 511 and 512 are rotated, first and second rollers 521 and 522 rotate as well. In various embodiments of the present invention, first rotating scissor extension member 511 is rotated by a first hydraulic roller motor 531 while second rotating scissor extension member 512 is rotated by a second hydraulic roller motor 532. With this structure, stationary EMI apparatus 300 is capable of inspecting test pipes 201 with different diameters ranging from 80-130 mm. In addition, stationary EMI apparatus 300 is capable of linearly moving test pipe 201 at varying speeds ranging from 0.1 m/s to 3 m/s. On the side of first foot stand 501 a first pipe adapting slot 503 is coupled to first rotating scissor extension member 511. On the side of second foot stand 502, a second pipe adapting slot 504 is coupled to second rotating scissor extension member 512. First pipe adapting slot 503 and second pipe adapting slot 504 enable stationary EMI apparatus 300 adapt to different sizes of test pipe 201 with diameters ϕ ranging from 80 mm to 130 mm by moving first rotating scissor extension member 511 along first pipe adapting slot 503 and second rotating scissor extension member 512 along second pipe adapting slot 504 using a pair of first hydraulic cylinder 541 and second hydraulic cylinder 542 respectively (see FIG. 6). A pair of vertical pivot pins 505-506 are designed to lock first conveyor roller 521 and second conveyor roller 522 to a fixed vertical position in accordance with the diameter φ of test pipe 201.

Continuing with FIG. 5 and FIG. 6, first conveyor roller 521 and second conveyor roller 522 are made up of anti-corrosion steel. In various embodiments of the present invention, a plurality of optical sensors and/or motion sensors (not shown) are placed on hydraulic conveyor roller 500 to detect tool joints (not shown) of test pipe 201. A programmable logic controller PLC (see FIG. 14) controls first hydraulic cylinder 541 and second hydraulic cylinder 542 to push first rotating scissor extension member 511 and second rotating scissor extension member 512 in opposite directions along first pipe adapting slot 503 and second pipe adapting slot 504 respectively. This is to avoid the tool joints being stuck by first conveyor roller 521 and second conveyor roller 522, causing damage to test pipe 201 and possibly the entire stationary EMI apparatus 300. In addition, the plurality of optical and/or motion sensors (not shown) are used to control first conveyor roller 511 and second conveyor roller 512 when the end of test pipe 201 is reached and/or when it needs to move test pipe 201 linearly backward for rescanning. Please refer to FIG. 14 for more details.

Figure 7:
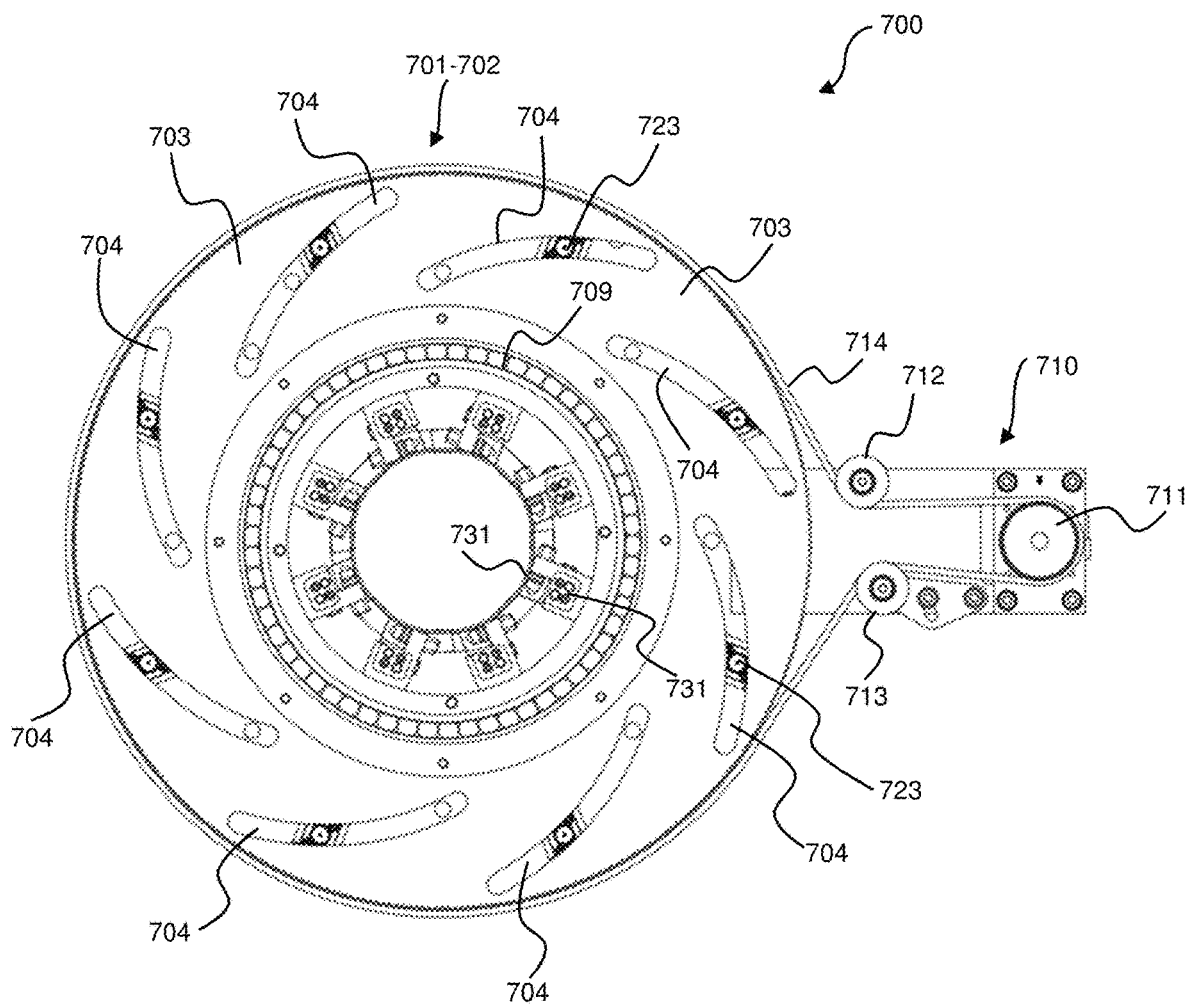
FIG. 7 is a 2D diagram of the stationary transverse flaw detecting module with an actuator spindle configured to precisely control the distance between an array of sensors and the outer surface of the test pipe in accordance with an exemplary embodiment of the present invention

Next, referring to FIG. 7 and FIG. 8A-FIG. 8D for the detailed description of transverse flaw detection module. In FIG. 7, a 2D diagram showing the façade of a transverse flaw detection module 700 is illustrated. FIG. 8A-FIG. 8D present the 3D diagrams that—together with FIG. 7—show the complete structure and constituting components of transverse flaw detection module 700. In various embodiments of the present invention, transverse flaw detection module 700 includes a double disc rotor 701 and 702 (see FIG. 8A-FIG. 8B) which is coupled to an actuator spindle 710 configured to control eight sensor arms 720 (see FIG. 8C-FIG. 8D). Each of sensor arms 720 has one terminal coupled to a pivot 723 and to an Archimedean groove 704 cut on the surface of an annulus 703 (FIG. 7, FIG. 8A-FIG. 8C). Pivot 723 moves and locks sensor arm 720 along Archimedean groove 704 (see FIG. 7, FIG. 8A-FIG. 8C). Each sensor arm 720 includes a first arm 721, a first joint 724, a second arm 722, a second joint 725, and a shoe pad 726 that supports staggering top magnetic sensor array 731 and a magnetic bottom magnetic sensor arrays 732 (array of inspection probes 211 in FIG. 2). Second joint 725 renders shoe pad 726 flexible and easily adapting to the curvature of each test pipe 201. Pivot 723 moves along Archimedean groove 704 and causes first arm 721 to move which, in turn, causes second arm 722 to move either toward or away from the outer surface of test pipe 201. Pivot 723 locks sensor arrays 731 and 732 to a fixed distance d with the outer surface of test pipe 201. As seen in FIG. 8C, top magnetic sensor array 731 and bottom magnetic sensor array 732 are positioned in the stagger manner along an axis 801 of test pipe 201. More particularly, top magnetic sensor array 731 is positioned before bottom magnetic sensor array 732 as viewed from the rear end of disc rotor 701-702. In other words, along the circumferential direction of disc rotor 701-702, an individual sensor in magnetic sensor array 731 is positioned above and next to an individual sensor of bottom magnetic sensor array 732. This staggering magnetic sensor arrays 731-732 is achieved by adjusting the length of second arm 722. In some embodiments of the present invention, a safety wheel 727 is connected to second joint 724 to protect magnetic sensor arrays 731-732. Safety wheel 727 is dimensioned so that its outer perimeter is flexibly on a higher plane than the outer surfaces of magnetic sensor arrays 731-732. As test pipe 201 is approaching dangerously close to top and bottom magnetic sensor arrays 731-732, safety wheel 727 prevents test pipe 201 from scraping and damaging magnetic sensor arrays 731-732. In some embodiments of the present invention, safety wheel 727 is achieved by a spring mechanism (not shown) coupled to a lock pin (not shown). This lock pin and spring mechanism is located inside second arm 722. If magnetic sensor arrays 731-732 have to be at distance d from the outer circumference of test pipe 201, safety wheel 727 is locked by the lock pin at a distance d+δ so that the moving test pipe 201 cannot scrape and damage top and bottom magnetic sensor arrays 731-732.

Continuing with FIG. 7 and FIG. 8A-FIG. 8D, a ballpoint bearing 709 located at the inner rim of annulus 703 is designed to assist the rotation of disc rotor 701-702. A bobbin 705 is connected to disc rotor 701-702. Bobbin 705 is made of aluminum alloy having stiffness and non-ferritic properties. A magnetic coil winding 707 is copper wire with a circular cross section having surface area 6-10 $mm^2$ guaranteeing magneto motive force greater than 12 kA/turn, generating a magnetic flux of greater than 400 Gauss and magneto motive force of 12 kA/turn in 6 hours straight without overheating the entire magnetic coil winding 707 of more than 60° C. In the long run, this guarantees electrical insulation between bobbin 705 and magnetic coil winding 707. Bobbin 705 is covered with a non-ferritic material such as ceramic which can sustain a temperature up to 80° C. The winding of magnetic copper coil winding 707 fills up to 80% of bobbin 705. Disc rotor 701-702, whose outer diameter is of 480 mm and weight of more than 200 kg, is mechanically connected to actuator spindle 710 which is connected to control eight sensor arms 720 (see FIG. 7). Inside actuator spindle 710, a driver pulley 711 connected to a first anchor pulley 712 set parallel to a second anchor pulley 713, all connected to disc rotor 701-702 by a cable 714. Driver pulley 711 is coupled directly to a pulley servo motor 715. A ballpoint bearing 721 helps rotate disc rotor 701-702 as a pulley servo motor 715 starts to operate. An aluminum foot stand 706, configured to support bobbin 705 and magnetic coil winding 707, is capable of supporting more than 500 kg weight.

Still referring to FIG. 7 and FIG. 8A-FIG. 8B, actuator spindle 710 is coupled to eight sensor arms 720 which are nestled in the circular space between disc rotor 701-702 (see FIG. 8A-FIG. 8C). In many embodiments of the present invention, top magnetic sensor array 731 and bottom magnetic sensor array 732 are arranged in two rows of four each aligned in a stagger manner along an axis 801 and around the circumference of disc rotor 701-702 (see FIG. 7 and FIG. 8A-FIG. 8C). This stagger arrangement ensures top and bottom magnetic sensor arrays 731-732 to achieve the following objects: detect transverse flaws 203 in a complete 360° around the circumference of test pipe 201. There are motion sensors and/or optical sensors (not shown) in communication with a microcontroller or PLC (see FIG. 14) in order to control the operation of transverse flaw detection module 700. In operation, when test pipe 201 is moving through the center and along axis 801, pulley servo motor 715 is activated by PLC (not shown) to rotate driver pulley 711. As a result, disc rotor 701-703 turns by the action of first anchor pulley 712, second anchor pulley 713, and cable 714. The rotation of disc rotor 701-702 causes sensor arms 720 to move along each of Archimedean grooves 704. All this to ensure that magnetic sensor arrays 732 and the outer surface of test pipe 201 to (1) parallel and stay constant at a distance d optimal for sensing magnetic leakages caused by transverse flaws 203; (2) avoid being damaged by tool joints; and (3) using safety wheel 727 to protect magnetic sensor arrays 731 and 732 from damage from being scraped by test pipe 201, thus saving maintenance costs and frequent replacements of parts.

Figure 9:
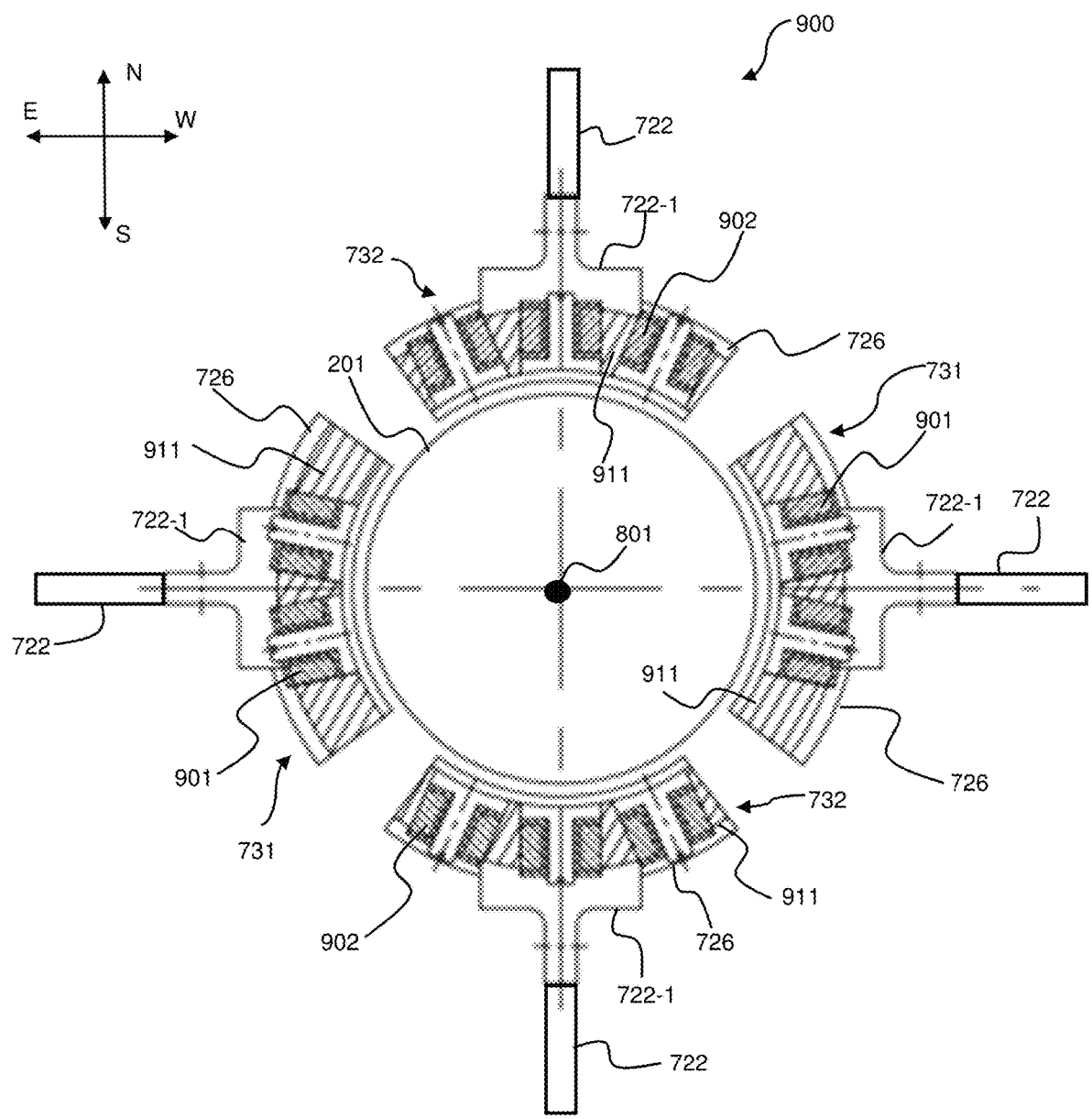
FIG. 9 is a 2D layout of the magnetic sensor arrays of the transverse flaw detection module in accordance with an exemplary embodiment of the present invention.

Next referring to FIG. 9, a 2D layout and structure 900 of top and bottom magnetic sensor arrays 731 and 732 in accordance with an exemplary embodiment of the present invention is illustrated. As disclosed above, top magnetic sensor arrays 731 and bottom magnetic sensor arrays 732 are arranged in a stagger manner with respect to axis 801 of disc rotor 701-702 which is co-axial with that of test pipe 201. This stagger arrangement of magnetic sensor arrays 731-732 is designed to scan the entire circumference of test pipe 201 for magnetic leakages caused by transverse flaws 203. This stagger arrangement is designed to avoid the cancellation of the normal components By of the magnetic flux between a positive lobe of one sensor and a negative lobe of the adjacent sensor. This cancellation may cause top and bottom magnetic sensor arrays 731-732 fail to detect the bell-shaped magnetic flux leakages caused by transverse flaws 203. In addition, the stagger arrangement and the structure described in FIG. 7 and FIG. 8A-FIG. 8D enable the precision in the control of distance d and the parallelism between magnetic sensor arrays 731-732 and the outer surface of test pipe 201. Geometrically, each shoe pad 726 has a shape of an annulus segment or a horse shoe. Each shoe pad 726 is bent to a curvature so that it can adapt to test pipe 201 with diameters of 2⅞ inches and 4½ inches. Shoe pad 726 is connected to a terminal of sensor arm 720 at second joint 725 and second arm 722. The other terminal of sensor arm 720 is coupled to Archimedean groove 704 via pivot 723. Structurally, each shoe pad 726 of top magnetic sensor array 731 is comprised of an array of four inductive sensors 901 surrounded by a non-ferromagnetic layer 911. Non ferromagnetic layer 911 is made of copper (Cu) supported by hard aluminum (Al). Inductive sensor 701 which is a pick-up coil. Similarly, shoe pad 726 of bottom magnetic sensor array 732 is comprised of an array of six inductive sensors 902 in form of pickup coils. The array of six inductive sensors are surrounded by non-ferromagnetic layer 911. Additionally, eight inductive sensors 901 of opposite top magnetic sensor arrays 731 are also arranged in stagger manner. Similarly, twelve inductive sensors 902 of opposite bottom sensor arrays 732 are arranged in stagger manner to one another. Each of inductive sensors 901-902 sweeps one-eighth (⅛) of the circumference of test pipe 201.

Continuing to FIG. 7, FIG. 8A-FIG. 8D, and FIG. 9, in operation, the leakage magnetic field caused by transverse defects 203 which cause a change of the magnetic flux through top magnetic sensor array 731 and bottom magnetic sensor array 732. The induced electromotive force generated by the magnetic leakage field can be expressed by the following formula $$V = N\frac{d\phi}{dt} = N\frac{d(B \cdot S)}{dt};$$ (eq. 1)

where N refers to the number of the pick-up coils 901 or 902; H refers to the magnetic flux leakage flux of pick-up coils 901 and 902; B refers to the magnetic induction intensity; S refers to the cross-sectional area of pick-up coils 901 and 902. In this advantageous embodiment of the present invention, only the relative variation of the magnetic field is measured by inductive coils 901-902, which is sensitive to high frequency signals. The sensitivity depends on the number of coils and the relative movement speed of test pipe 201.

Figure 10:
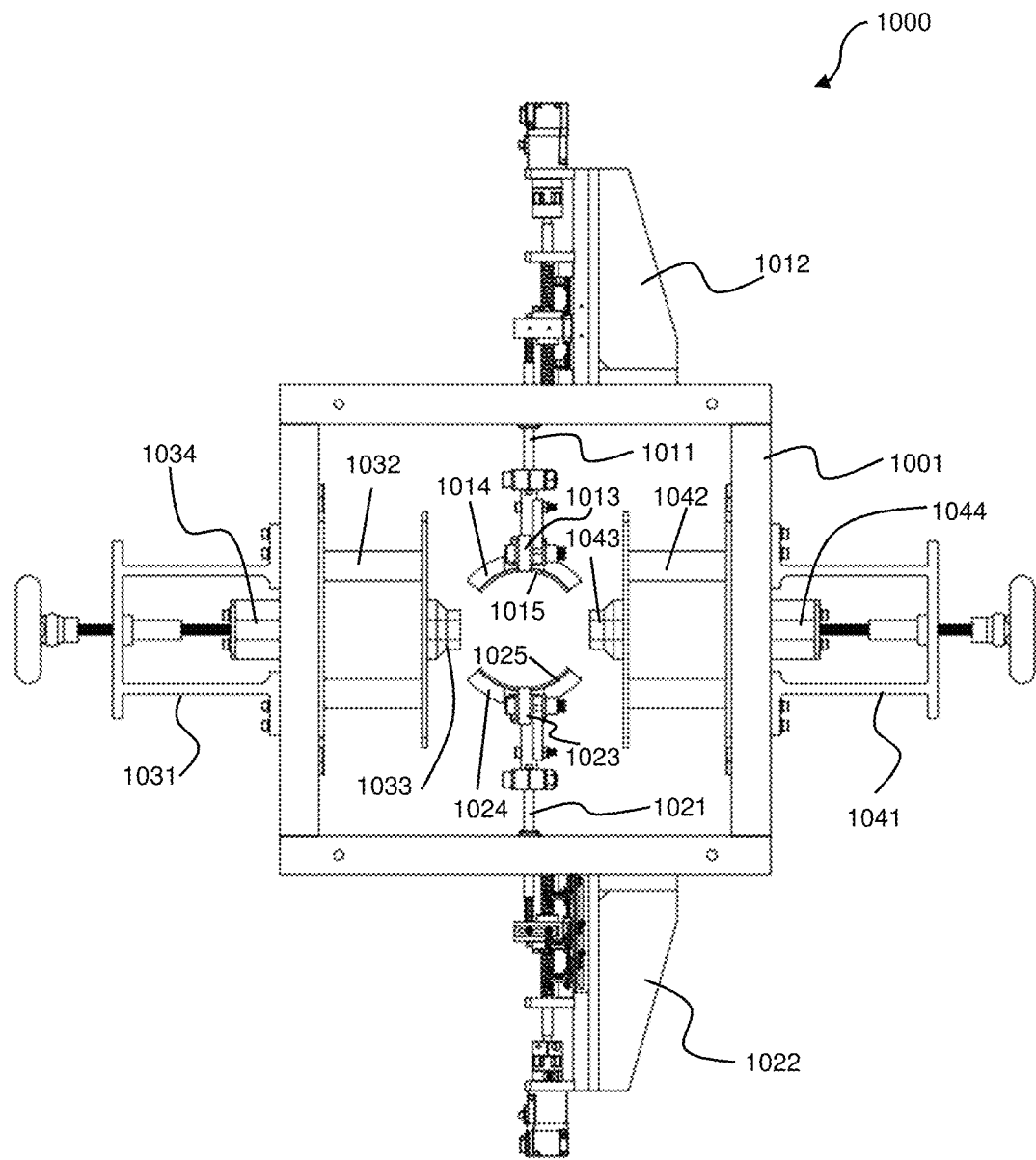
FIG. 10 is a 2D perspective diagram showing the structure of the first longitudinal flaw detection module in accordance with an exemplary embodiment of the present invention.

Next referring to FIG. 10, a 2D diagram describing a first longitudinal flaw detection module 1000 in accordance with an exemplary embodiment of the present invention is illustrated. First longitudinal flaw detection module 1000 includes a square frame 1001 made of steel with a magnetic permeability of $10^{-3}$ T·m/A. Square frame 1001 has an area of 500 mm×500 mm with a frame surface area 100 cm². At the middle of the top side is a first screw arm 1011 connected to a first servo motor 1012. At the distal tip of first screw arm 1011, a first shoe pad 1014 and a first safety wheel 1013 are connected. First safety wheel 1013 and first shoe pad 1014 are lined up so that the incoming test pipe 201 cannot scrape and damage a first magnetic arrays (see FIG. 12) that is deposited on the surface of first shoe pads 1014. On the bottom side, opposite to the top side, a second screw arm 1011 connected to a second servo motor 1022. At the distal tip of second screw arm 1021, a second shoe pad 1024 and a second safety wheel 1023 are connected together. Second safety wheel 1023 and second shoe pad 1024 are lined up so that the incoming test pipe 201 cannot scrape and damage a second magnetic array (see FIG. 12) which is deposited on the outer surface of second shoe pads 1024. The structure of first safety wheel 1013 and second safety wheel 1023 is the same as that of safety wheel 726 described above in FIG. 8A-FIG. 8D.

Continuing with FIG. 10, on the left side of square frame 1001, a first ball screw spindle 1031 is coupled to a first magnetizing coil 1032 and to a first magnetic pole 1033. First magnetizing coil 1032 is made of aluminum alloy and wound with 1,000 wire turns. The wire is copper (Cu) and has square or circular cross-sectional area of about 3-5 mm2. This type of copper wire guarantees a magnetomotive force greater than 10 kA·turn that creates a magnetic field of more than 2000 Gauss on the surface of first magnetizing coil 1032. The magnetic field between two magnetizing coils at 150 mm distance is greater than 400 Gauss. First magnetic pole 1033 is made of low carbon steel with the magnetic properties rather like the steel 1008 that has a magnetic permeability coefficient greater than $10^{-3}$ T·m/A. In various embodiments of the present invention, first magnetic pole 1033 has three configurations: rectangular pole, trapezium pole, and trapezium pole with steel wire brush (see FIG. 12). Similarly, on the right hand side of square frame 1001, a second ball screw spindle 1041 is coupled to a second magnetizing coil 1042 and to a first magnetic pole 1043, all having the same structure and characteristics with their counterparts on the left side as described above.

Figure 11:
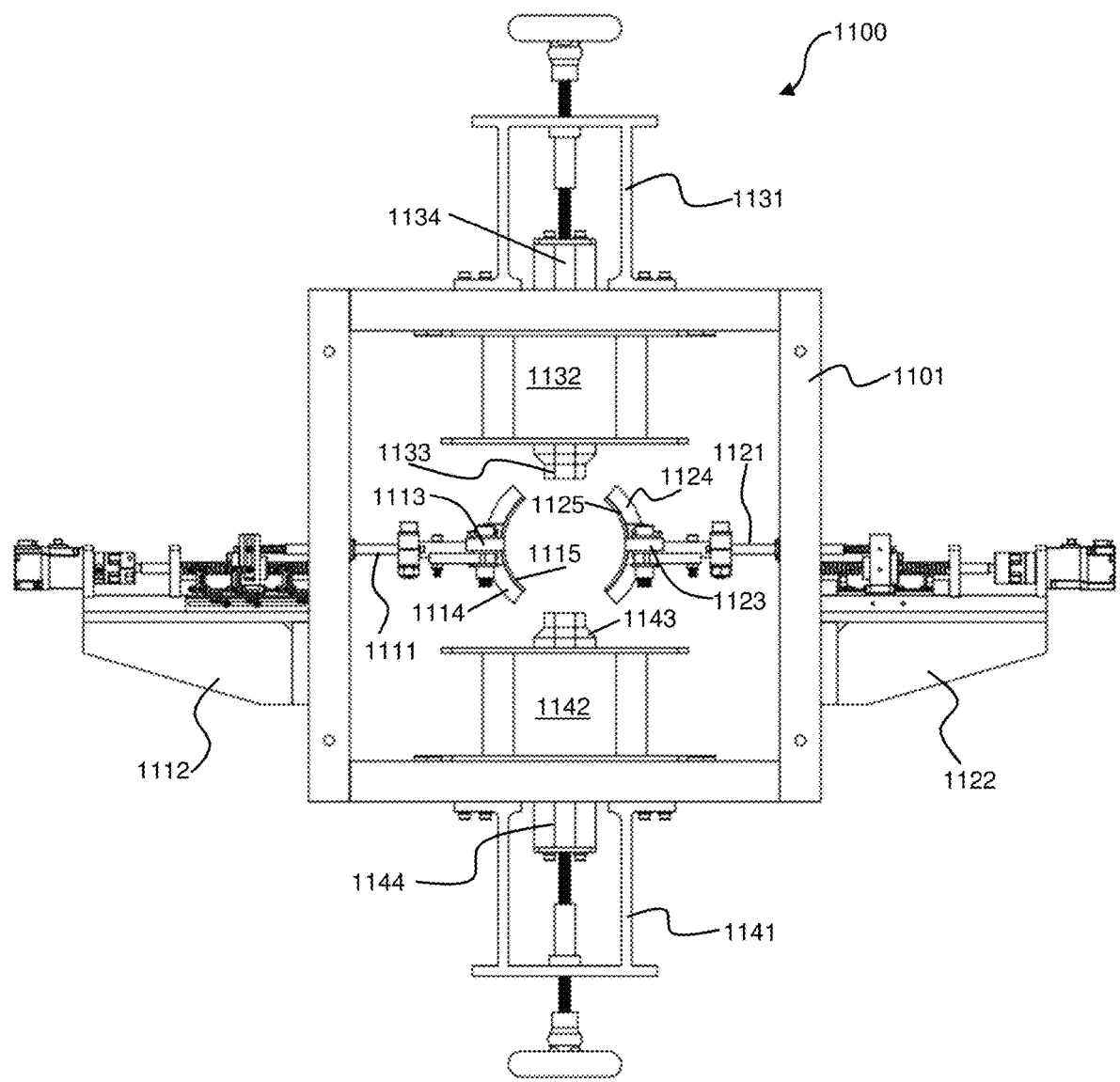
FIG. 11 is a 2D perspective diagram showing the structure of the second longitudinal flaw detection module in accordance with an exemplary embodiment of the present invention.

Next referring to FIG. 11, a 2D diagram describing a second longitudinal flaw detection module 1100 in accordance with an exemplary embodiment of the present invention is illustrated. Second longitudinal flaw detection module 1100 includes a square frame 1101 made of steel with a magnetic permeability of $10^{-3}$ T·m/A. Square frame 1101 has an area of 500 mm×500 mm with a frame surface area 100 cm². Different from first longitudinal flaw detection module 1000, located at the middle of the left side is a third screw arm 1111 connected to a third servo motor 1112. At the distal tip of third screw arm 1111, a third shoe pad 1114 and a third safety wheel 1113 are connected together. Third safety wheel 1013 and third shoe pad 1014 are lined up so that the incoming test pipe 201 cannot scrape and damage a third magnetic arrays (see FIG. 12) that is deposited on the surface of third shoe pads 1114. On the right side, opposite to the left side, a fourth screw arm 1121 connected to a fourth servo motor 1122. At the distal tip of fourth screw arm 1121, a fourth shoe pad 1124 and a fourth safety wheel 1123 are connected together. Fourth safety wheel 1123 and fourth shoe pad 1124 are lined up so that the incoming test pipe 201 cannot scrape and damage a fourth magnetic array (see FIG. 12) that is deposited on the outer surface of fourth shoe pads 1124.

Continuing with FIG. 11, on the top side of square frame 1101, a third ball screw spindle 1131 is coupled to a third magnetizing coil 1132 and to a third magnetic pole 1133. Third magnetizing coil 1132 is made of aluminum alloy and wound with 1,000 wire turns. The wire is copper (Cu) and has square or circular cross-sectional area of about 3-5 mm2. This type of copper wire guarantees a magnetomotive force greater than 10 kA·turn that creates a magnetic field of more than 2000 Gauss on the surface of third magnetizing coil 1132. The magnetic field between two magnetizing coils at 150 mm distance is greater than 400 Gauss. Third magnetic pole 1133 is made of low carbon steel with the magnetic properties rather like the steel 1008 that has a magnetic permeability coefficient greater than $10^{-3}$ T·m/A. In various embodiments of the present invention, third magnetic pole 1133 has three configurations: rectangular pole, trapezium pole, and trapezium pole with steel wire brush (see FIG. 12). Similarly, on the bottom side of square frame 1101, a fourth ball screw spindle 1141 is coupled to a fourth magnetizing coil 1142 and to a fourth magnetic pole 1143, all having the same structure and characteristics with their counterparts on the top side as described above.

Figure 12:
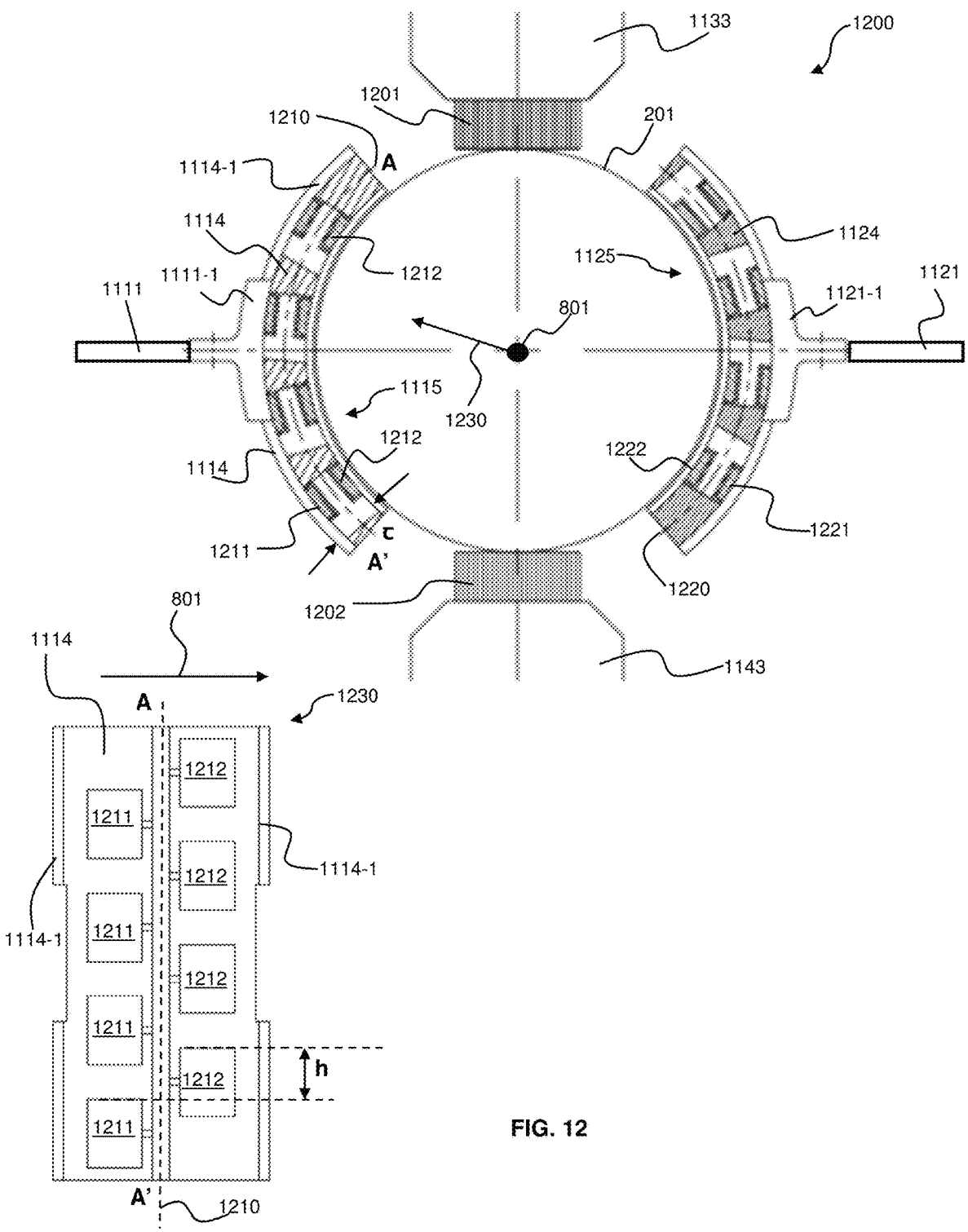
FIG. 12 is a 2D layout of the magnetic pick-up sensor array and the trapezium structure with steel wire brush of the magnetic poles in accordance with an exemplary embodiment of the present invention.

Next referring to FIG. 12, a 2D layout of a sensor array 1200 for detecting longitudinal flaws in accordance with an exemplary embodiment of the present invention is illustrated. As described above, first to fourth magnetic poles 1033, 1043, 1133, and 1143 have the same material and geometrical shape but they are placed in pair and orthogonal to each other. That is: first and second magnetic poles 1033, 1043 are placed 90° offset from third and fourth magnetic poles 1133, 1143. Consequently, the same positional relationship has to apply to first to second shoe pads 1014, 1024 and third to fourth shoe pads 1114, 1124. The preferred embodiment for the shape of magnetic poles 1033 to 1143 is the trapezium with steel wire brush. A first steel wire brush 1201 is connected to the end surface third magnetic pole 1133. A second steel wire brush 1202 is connected to the end surface of fourth magnetic pole 1143. In first longitudinal flaw detection module 1000 or second longitudinal flaw detection module 1100, first steel wire brush 1201 is facing second steel wire brush 1202. First to second shoe pads 1014 to 1024 each comprises an array of eight inductive sensors (see FIG. 12 for same structure) which are inductive pick-up coils having the same structure as pick-up coils 901 and 902 described above. Similarly, third shoe pad 1114 comprises an array of eight inductive sensors 1211 which are inductive pick-up coils having the same structure as pick-up coils 901 and 902 described above. Fourth shoe pad 1124 comprises an array of eight inductive sensors 1221 and 1222 which are inductive pick-up coils having the same structure as pick-up coils 901 and 902 described above. The structure of array of eight inductive sensors 1211 and 1221 is the same and described as follows. Layout diagram 1200 is viewed along axis 801 looking into the page of FIG. 12. Another view 1230 along the line AA' shows that four inductive sensors 1211 on the top row is arranged before and in stagger manner with four inductive sensors 1212 in the bottom row along axis 801. More clearly, if walking into the page of FIG. 12, top array of inductive sensors 1211 is seen before bottom array of inductive sensors 1212. In addition, each top and bottom inductive sensors 1211 and 1212 are positioned in stagger manner. With this arrangement, circumferential magnetic flux lines and the gradient of magnetic fields can be detected by these inductive sensors 1211 and 1212. Please refer to equation 1.

Figure 14:
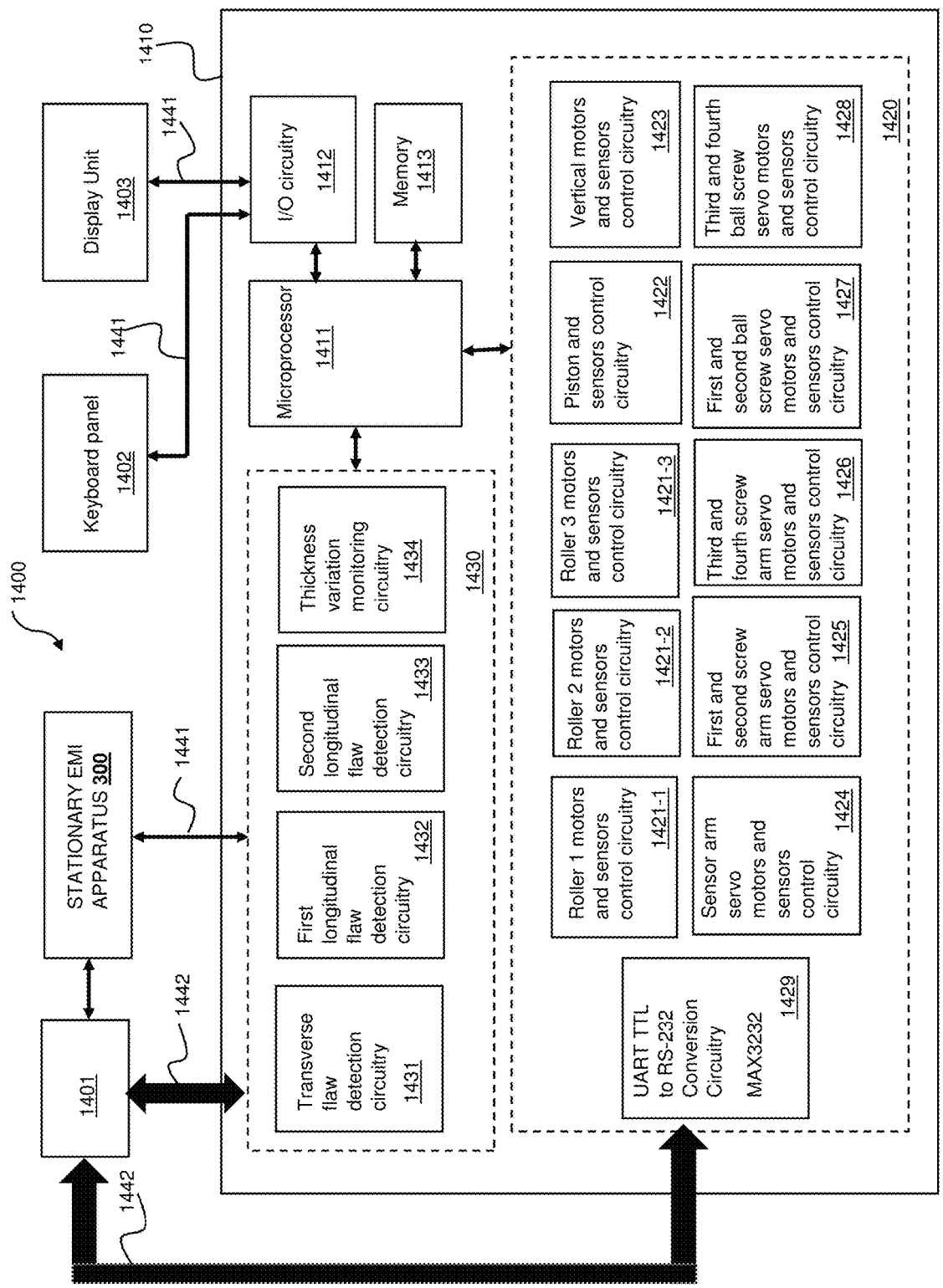
FIG. 14 is a schematic diagram of a controller system designed to control the operations of the stationary EMI apparatus in accordance with an exemplary embodiment of the present invention.

Continuing with FIG. 12, a field of view (FOV) 1230 perpendicular to axis 801 disclosed the staggering arrangement between top inductive sensors 1211 and bottom inductive sensors 1212. FOV 1230 reveals that shoe pads 1114 and 1124 each is mechanically connected a first shoe pad connector 1111-1 and 1121-1 respectively. Shoe pad 1114 has is a three-dimensional device with a thickness c which constitutes bottom layer 1114-1 and a middle layer which is shoe pad 1114 carved out to posit first inductive sensor 1211 and second inductive sensors 1212 at different height h and in stagger manner as shown in FOV 1230. Elongated grooves 1210 is cut out to insert conductive cables (not shown) so as to connect to first inductive sensors 1211 and second inductive sensors 1212 to external circuitry as shown in FIG. 14. FOV 1230 shows a segment of array of magnetic sensors 1115. The same structure is applied to opposite shoe pad 1224 and magnetic sensor arrays 1125.

Figure 13:
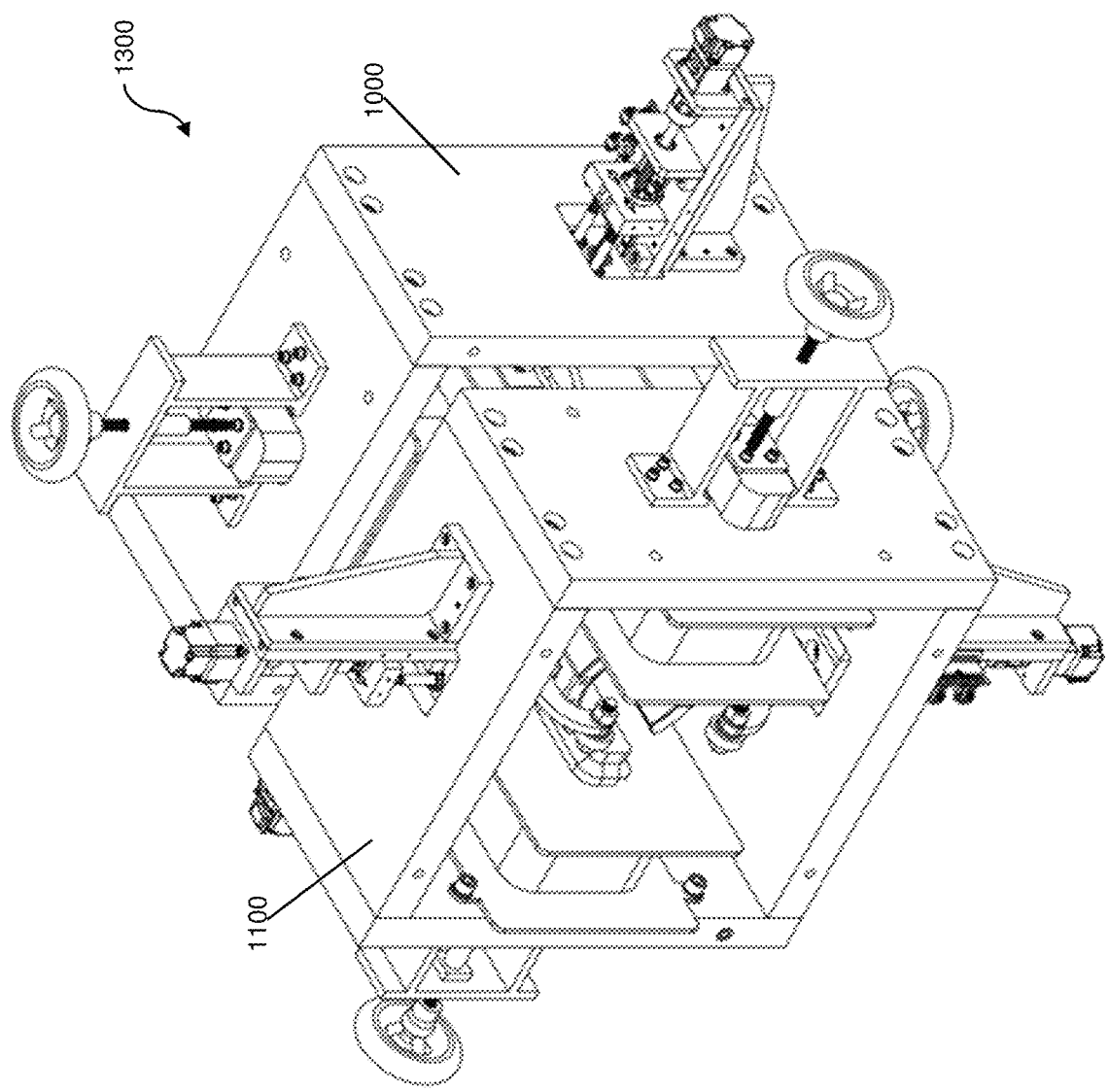
FIG. 13 is a 3D view demonstrating the juxtaposition of the first longitudinal flaw detection module and the second longitudinal flaw detection module whose components are positioned orthogonal relative to one another in accordance with an exemplary embodiment of the present invention.

Next, referring to FIG. 13, a 3D perspective view 1300 showing the relative orthogonal position between the first longitudinal flaw detection module and the second longitudinal detection module in accordance with an exemplary embodiment of the present invention is illustrated. As described in FIG. 2 to FIG. 12, first longitudinal flaw detection module 1000 and the second longitudinal detection module 1100 are positioned next to each other on adapting bed frame 420. The order of which one is placed first is unimportant. More particularly, first longitudinal flaw detection module 1000 is secured to divider 451 and second longitudinal flaw detection module 1100 is secured to divider 452. Structurally, their components are the same but arranged 90° out of phase. In other words, their components are arranged orthogonal to one another. In various embodiments of the present invention, a thickness variation monitoring device (not shown) is deployed with first longitudinal flaw detection modules 1000 and second longitudinal flaw detection module 1100. It is noted that any publicly disclosed thickness variation monitoring devices used with the above described transverse flaw detection module 700 first longitudinal flaw detection modules 1000 and second longitudinal flaw detection module 1100 in the manner described above are within the scope of the present invention.

Referring now to FIG. 14, a block diagram of a controller system 1400 designed to test, store, and display the test results of stationary EMI apparatus 300 in accordance with an exemplary embodiment of the present invention is illustrated. Controller system 1400 includes stationary EMI apparatus 300 equipped with different sensors, a pre-amplifier filter system and ADC unit 1401, a keyboard panel 1402, a display unit 1403, and a controller board 1410. The output voltages of the sensors discussed above in FIG. 2 to FIG. 13 are input to pre-amplifier and filter and ADC unit 1401 in which the analog output voltages are passed through filter-amplifiers electronic system then is converted to the digital voltage by a 12 bits analog-to-digital converter (ADC) for sending the data to controller board 1410 through the universal asynchronous receiver transmitter (UART) connections 1442. Inside controller board 1410, a mechatronic module 1420 for controlling hydraulic motors and servo motors listed above, flaw detection module 1430 for receiving and transmitting test results as well as test parameters to stationary EMI apparatus 300, a microprocessor STM32F767 1411, an I/O circuitry 1412 for receiving and displaying external instructions and test parameters on display unit 1403, and a memory unit 1413 for storing test results and test parameters. Mechatronic module 1420 includes first roller motors and sensors control circuitry 1421-1, second roller motors and sensors control circuitry 1421-2, a third roller motors and sensors control circuitry 1421-3, pistons and sensors control circuitry 1422, vertical motors and sensors control circuitry 1423, sensor arm servo motors and sensors control circuitry 1424, first and second screw arm servo motors and sensors control circuitry 1425, third and fourth screw arm servo motors and sensor control circuitry 1426, first and second ball screw servo motors and sensors control circuitry 1427, third and fourth ball screw servo motors and sensors control circuitry 1428, and UART TTL to RS232 conversion IC (MAX3232) 1429. The listed control circuitry 1421-1 to 1428 include both hardware and software that are designed to facilitate the controls and operations in the manner described above of stationary EMI apparatus 300. UART TTL to RS-232 circuitry 1429 enables serial communication between stationary EMI apparatus 300 and controller board 1410. Detection module 1430 further includes transverse flaw detection circuitry 1431, first longitudinal flaw detection circuitry 1432, second longitudinal flaw detection circuitry 1433, and a thickness variation monitoring circuitry 1434.

Continuing with FIG. 14, first roller hydraulic motors and sensors control circuitry 1421-1 is designed to control all operational aspects of first hydraulic clamping roller 331, second roller hydraulic motors and sensors control circuitry 1421-2 is designed to control all operational aspects of second hydraulic clamping roller 332, and third roller hydraulic motors and sensor control circuitry 1421-3 is designed to control all operational aspects of third hydraulic clamping roller 333. More particularly, these circuitry 1421-1 to 1421-3 are designed to control all operational aspects of first and second hydraulic roller motors 531 and 532 in hydraulic clamping rollers 331-333 respectively. Hydraulic cylinders and sensors control circuitry 1423 is designed to control all operational aspects of four corner and middle hydraulic motors 411 and 412. Sensor arm servo motors and sensors control circuitry 1424 is designed to control all operational aspects of pulley servo motor 715. First and second screw arm servo motors and sensors control circuitry 1425 is designed to control all operational aspects of first and second servo motors 1012 and 1022. Third and fourth screw arm servo motors and sensors control circuitry 1426 is designed to control all operational aspects of third and fourth servo motors 1112 and 1122. First and second ball screw servo motors and sensors control circuitry 1427 is designed to control all operational aspects of first and second ball screw servo motors 1034 and 1044. Third and fourth ball screw servo motors and sensors control circuitry 1427 is designed to control all operational aspects of first and second ball screw servo motors 1034 and 1044. These servo control circuitry 1424-1428 in mechatronic module 1420 receive feedback signals from respective servo motors 714 to 1144. Microprocessor 1411 compares these feedback signals to predetermined threshold signals and issues error signals. Upon receiving the error signals, servo control circuitry 1424-1428 send out control signals that precisely adjust servo motor 714 to 1144. Servo control circuitry 1424-1428 require supporting software from the library of microprocessor 1411 such as STM32F767VG or Arduino microcontroller processing that uses Arduino programming language.

Transverse flaw detection circuitry 1431 is designed to control all operational aspects of transverse flaw detection module 700 described in FIG. 7, FIG. 8A-FIG. 8D, and FIG. 9. First longitudinal flaw detection circuitry 1432 is designed to control all operational aspects of first longitudinal flaw detection module 1000. Second longitudinal flaw detection circuitry 1433 is designed to control all operational aspects of second longitudinal flaw detection modules 1100. Output signals carrying flaw information from modules 700, 1000, and 1100 are first filtered, pre-amplified, and converted to digital signals by pre-amplifier filter system and ADC unit 1401. Microprocessor 1411 is programmed to determine whether transverse flaws 203 and/or longitudinal flaws 202 have occurred to test pipe 201. Then microprocessor 1411 stores the test results and test parameters to memory 1413 for later use. I/O circuitry 1412 sends the test results to display unit 1403. In some embodiments of the present invention, microprocessors 1411 is trained to distinguish between interior flaws, middle flaws, or exterior flaws using support vector method (SVM).

Controller system 1400 achieves the following objectives of the present invention:
(1) feedback control mechanism that precisely achieves distance d from magnetic sensor arrays to the outer surface of test pipe 201, thus avoiding damage to stationary EMI apparatus 300 and reducing unreliable result data;
(2) computerized and automatic testing process that save time and cost-effective such as the detection of tool joints; and
(3) capability of analyzing complex results data using microprocessors which can be trained to differentiate between noises due to wobbling and flaw signals.

Figure 15:
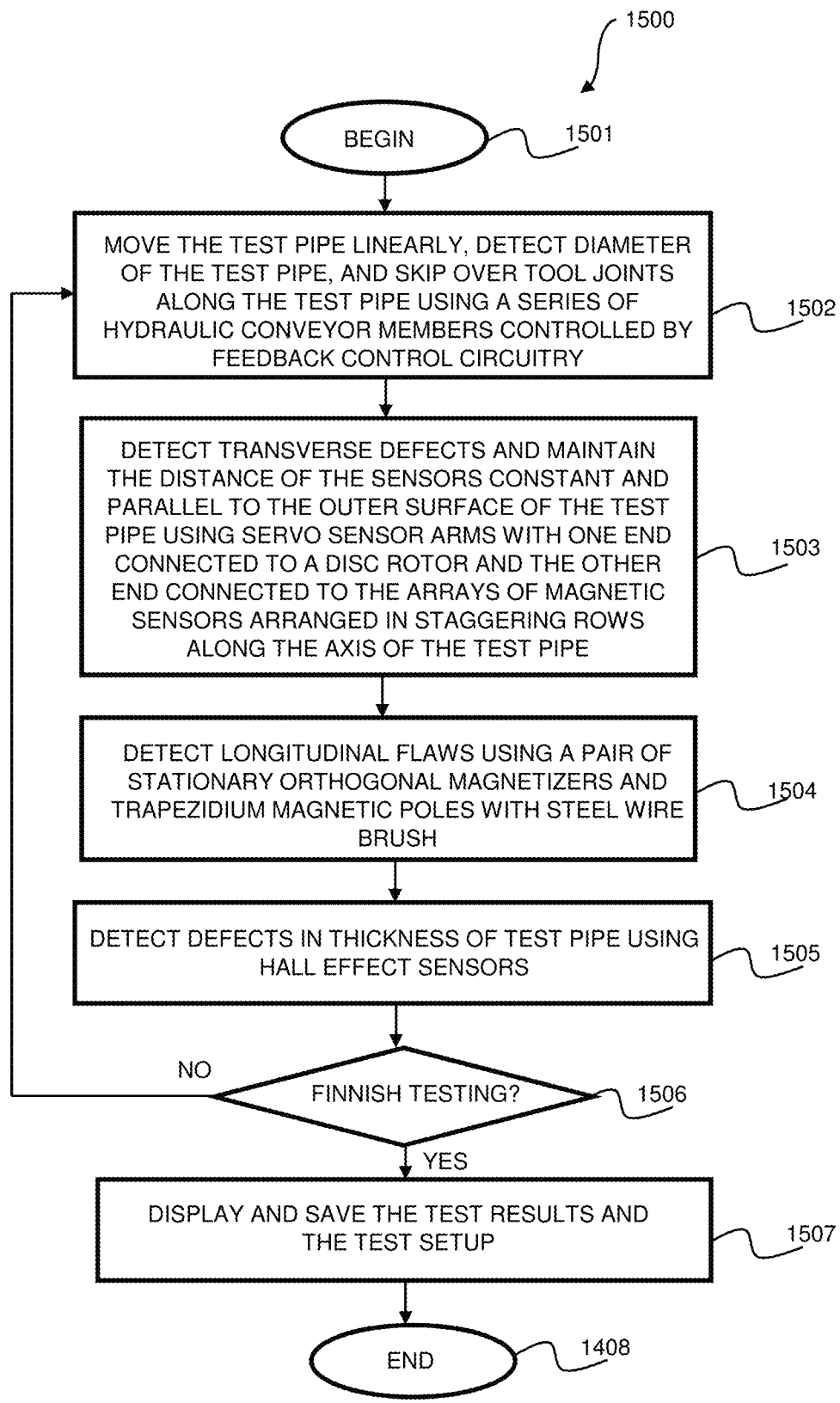
FIG. 15 is a flow chart showing a method of electromagnetic inspection of tubular products in accordance with an exemplary embodiment of the present invention.

Referring to FIG. 15, a method 1500 of electromagnetic inspecting for flaws in test pipes in accordance with an aspect of the present invention is illustrated. In many aspects of the present invention, method 1500 is used with stationary EMI apparatus 300 as described above and in FIG. 2 to FIG. 14. In other aspects of the present invention, method 1400 is used with other testing apparatuses such as electromagnetic inspection (EMI) with non-destructive tests (NDT).

At step 1501, the test begins by calibrating and setting up an electromagnetic inspection (EMI) apparatus as well as controller system 1400. In many aspects of the present invention, step 1501 is realized by preparing and calibrating stationary EMI apparatus 300 equipped with motion and/or optical sensors (not shown) in communication with a microcontroller or programmable logic controller (PLC) such as microprocessor 1411 as described in FIG. 14. Within step 1501, the height of base 310 and adapting bed 320 can be set using vertical motors and sensors control circuitry 1423 to set the height of corner and middle motors 411 and 412. Microprocessor 1411 can memorize the preferred height and store it in memory 1413. Furthermore, step 1501 also includes adjusting the sensitivity of stationary EMI apparatus 300 to suite individual user requirements. It is usually calibrated to meet approved standards such as American Society for Testing and Materials (ASTM) or American Petroleum Institute (API).

At step 1502, the test pipe is moved linearly using a system of hydraulic conveying arms. In many aspects of the present invention, step 1402 is realized by first hydraulic clamping roller 331, second hydraulic clamping roller 332, and third hydraulic clamping roller 333. Furthermore, optical and/or motion sensors detect the diameter ϕ of the test pipe and the controller (not shown) communicates to first to third hydraulic clamping rollers 331-333 to move first and second hydraulic roller motors 531 and 532 in the manner described above in order to adapt to the right dimension of the test pipe. Step 1502 is also realized by first to third roller motors and sensors control circuitry 1421-1 to 1421-3. In addition, step 1502 is realized by using hydraulic cylinders and sensor control circuitry 1422 and first to second hydraulic cylinder 541 to 542 to adjust to the right dimension for test pipe 201 and avoid tool joints.

At step 1503, transverse flaws are detected. In many aspects of the present invention, transverse flaws 203 are detected using transverse flaw detection module 700 (or 340 in FIG. 3). Microprocessor 1411 is used to perform step 1503 as described above. Step 1503 is realized by transverse flaw detection circuitry 1431 in controller system 1400. In addition, step 1503 is realized by sensor arm servo motors control circuitry 1423 and pulley servo motor 715 to achieve distance d which allows to obtain clear test results without noises. In addition, step 1503 is practiced with safety wheel 727 that protect magnetic sensor arrays 731 and 732.

At step 1504, longitudinal flaws are detected. In many aspects of the present invention, longitudinal flaws 202 are detected using first longitudinal flaw detection module 1000 and second longitudinal flaw module 1100 arranged orthogonally and structured as described above in FIG. 10-FIG. 13. Microprocessor 1411 is used to perform step 1504 as described above. Step 1504 is realized by first and second longitudinal flaw detection circuitry 1432 and 1433 in controller system 1400. In addition, step 1503 is realized by first and second screw arms and sensors control circuitry 1425, third and fourth screw arms and sensors control circuitry 1426, first and second ball screw servo motors and sensors control circuitry 1427, and third and fourth ball screw servo motors and sensors control circuitry in connection with servo motors 1012, 1022, 1112, 1122, 1034, 1044, 1134, and 1144 in order to achieve optimal distance d which allows to obtain clear test results without noises. In addition, step 1503 is practiced with safety wheel 1013, 1023, 1113, and 1143 that protect magnetic sensor arrays 1015, 1025, 1115, and 1125 respectively.

At step 1505, thickness flaws (pits) are detected. In many aspects of the present invention, thickness flaws of the test pipe are detected using thickness variation monitoring circuitry 1434 that are commercially available in the market.

At step 1506, whether the test for a particular pipe is finished is determined. Step 1506 is realized by a controller or by visual inspection of the engineers or technicians. If the test is not finished, step s 1502 to 1506 are repeated.

At step 1507, if the test is finished, the results are displayed as described in the Experiment section below and test parameters such as the diameter φ of test pipe 201, the distances d between the outer surface of the test pipe and magnetic sensors arrays 901-904, 1015, 1025, 1115, 1125, and magnetizers 1033, 1043, 1133, and 1143; speed of test pipe 201, input signals, etc. are stored in memory 1413. Test results are displayed on display unit 1403.

At step 1508, the test is ended.

EXPERIMENTS

In this experiment, a novel orthogonal magnetizer 200 includes a first longitudinal flaw detection module 1000 and 1100 as shown in FIG. 10 and FIG. 11 that consists of two couples of magnetic pole shoes 1033, 1043, 1133, and 1143 locating at different axial locations around test pipe 201 and are orthogonal to each other (see FIG. 10, FIG. 11, and FIG. 13). If the detectable zone produced by one couples of magnetic pole shoes is larger than 90°, two orthogonal couples of magnetic pole shoes may accomplish the inspection zone for the full circumference.

To simulate the magnetic field distribution generated by the orthogonal magnetizers such as first to fourth magnetizing coils 1033, 1043, 1133, and 1143, the finite element method (FEM) in ANSYS software. This FEM method is powerful and widely used for investigation of the magnetic field distribution and basic electromagnetic characteristics [5-6]. In this method, a typical magnetic field problem is described by defining the geometric properties, material properties, currents, and boundary conditions. The computer will solve the Maxwell's equation to obtain the numerical solution and output the desired parameters. In our simulation, the steel 1008 is chosen for the back-iron yoke and the test pipe with the B-H curve taken from library of the software. The shape and the size of the magnetizer are chosen and shown in FIG. 10, FIG. 11, and FIG. 12.

The shape of the magnetic pole is an important impact on the distribution of the magnetic field. Thus, three configurations of magnetic poles have been simulated: rectangular pole, trapezium pole and trapezium pole with steel wire brush. The results indicate that the trapezium pole with steel wire brush is the best configuration to produce a uniform distribution of the magnetic field. With this configuration, the detectable zone is about 90°, hence it is possible to employ the new model of magnetizer. The simulation results also reveal the challenger of the method since the MFL is rather small compared to the background and will decrease fast as increasing the sensor lift-off. To overcome this fact, the pickup coil as the magnetic sensor arrays 1014, 1024, 1114, and 1124 because it will detect the change of magnetic field caused by defect instead of measuring the magnetic field. In addition, avoidance of the wobble effect is a strictly requirement. The best result is obtained from simulation for the configuration of the trapezium pole with steel wire brush, 4 mm sensor lift-off, and 10 kA·turn magnetomotive force. The figure illustrates the magnetic distribution along circumferential direction with a MFL peak produced by a groove having 1 mm depth and 1 mm wide.

The test EMI system consists of the first longitudinal defect inspection unit 1000, the second longitudinal defect inspection unit 1100 and the transverse defect inspection unit 700. The prototype longitudinal defect inspection unit is shown in FIG. 2, FIG. 10, FIG. 11, FIG. 12, and FIG. 13.

In the described longitudinal defect inspection unit 1000-1100, the back-iron yoke and the magnetic poles 1033, 1043, 1133, and 1143 are made of low carbon steel with the magnetic properties rather like the steel 1008 used in simulation. The magnetizing coil 1032, 1042, 1132, and 1142 has 1000 wire turns. To concentrate the magnetic lines into the test pipe 201, the configuration of the trapezium pole with steel wire brush is selected. The distance d between two poles, e.g., 1033 and 1043 can be adjusted for matching the diameter of the test pipes 201. The magnetic sensors 1014, 1024, 1114, and 1124 are pickup coils with iron cores. To accomplish the inspection zone of 90°, each shoe pad 1014, 1024, 1114, and 1124 consists of 8 pickup coils 901-904 arranged in an array along circumferential direction to detect the tangential component of the magnetic flux leakage. The output voltage of the sensor is connected to the filter-amplifiers electronic system then is converted to the digital voltage by a 12 bits analog-to-digital converter (ADC) for sending the data to a computer through the universal asynchronous receiver transmitter (UART) connection. Because the test pipes commonly consist of the tool joints at two ends of pipes, the shoe pads should be able to move closer/further the surface of pipes. This requirement is satisfied by using a servo motor system that is automatically controlled.

To avoid the wobble effect that may cause noise, the stationary EMI apparatus 300 is equipped with a hydraulic conveyor system such as hydraulic clamping roller 600, see FIG. 5 and FIG. 6. In the presence of this system, the test pipes can be centered by the clamping of the roller pair as the tube is inserted into the measuring area. The opening and closing mode of the roller pair is controlled by optical sensors and position switches. The distance between the rollers and the clamping force are changeable and controlled in accordance with the pipe diameter from 60-120 mm. The test pipes can move forward and backward with the speed ranging from 0.1 m/s to 0.6 m/s. All parameters such as hydraulic pressure, distance between two rollers, speed, direction of motion is manually controlled or PLC and displayed on the control panel. The speed and position of pipes are displayed on the computer in real-time mode.

Figure 16:
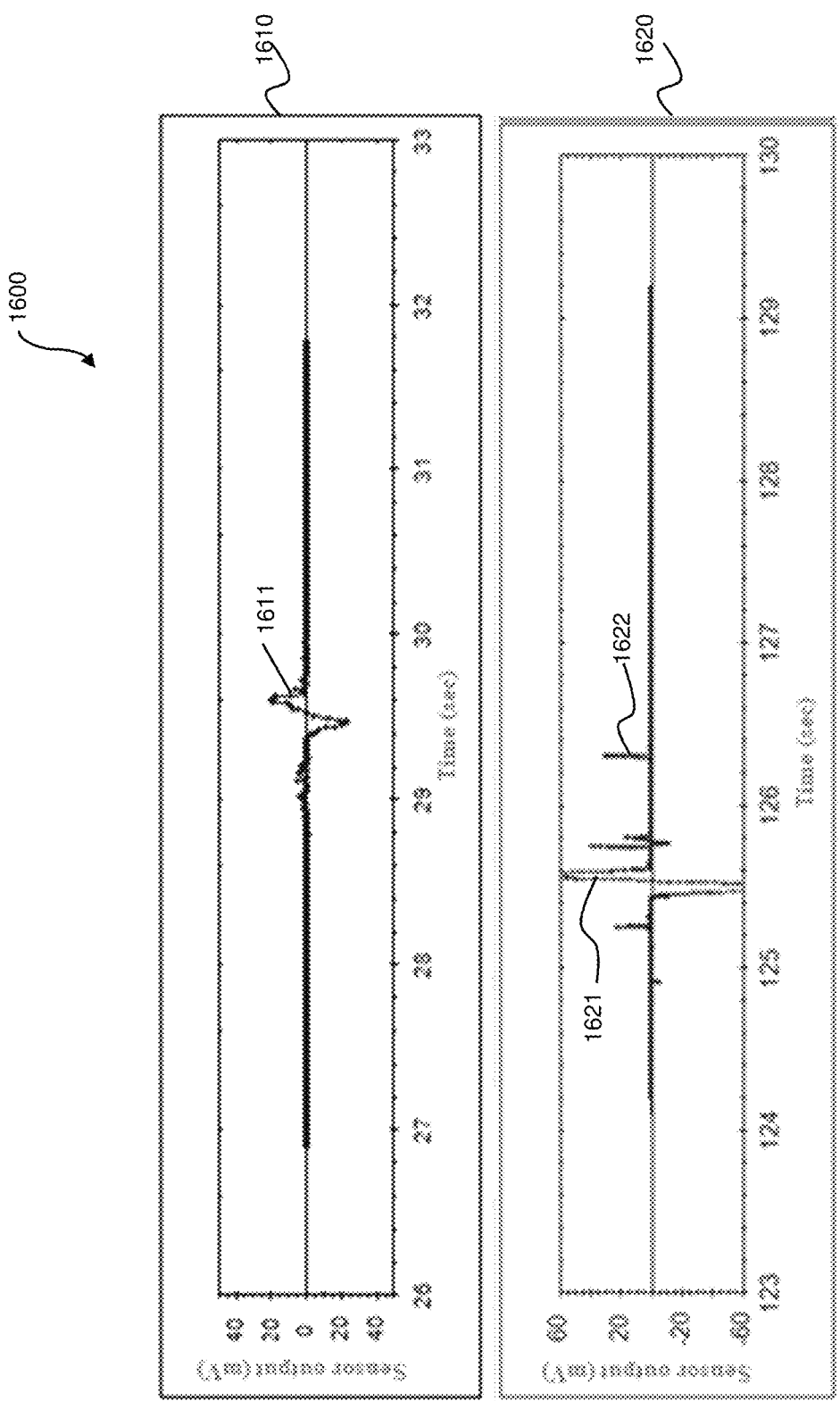
FIG. 16 is the scanning charts ran on a test pipe at different speeds.

Referring to FIG. 16, the test sample is a 2⅞" tubing pipe having a longitudinal groove with the depth of 1 mm, the wide of 1 mm and the length of 50 mm. FIG. 16 shows two scanning charts ran on the above pipe with different speed, i.e., 0.1 m/s and 0.3 m/s. Graphs 1600 include a graph 1610 for testing at speed of 0.1 m/s and graph 1620 for testing at 0.3 m/s.

In both graphs 1610 and 1620, it can be seen clearly that the peak 1611 and 1621 indicates the presence of the defect. However, it can also be observed that the unwanted peaks 1622 caused by the mechanical shock. It can be identified the MFL signal of the defect by the fact that the shape of the noise 1622 caused by mechanical shock is usually narrow, with only one dimension, while the MFL signal has two peaks in the opposite direction. In addition, the higher the measurement speed, the stronger the signal, so it is in line with the goal of improving the measurement speed. The problem is how to control mechanical shock to reduce noise.

In conclusion, a novel EMI system in which the longitudinal flaw inspection system consists of an orthogonal magnetizer 1033, 1043, 1133, and 1143 and four magnetic sensor arrays 1014, 1024, 1114, and 1124 so that it only requires a linear motion of test pipe 201. This new type of longitudinal flaw inspection system allows to speed up the inspection rate to 0.6 m/s while the maximum speed of the conventional system is about 0.15 m/s. To avoid the wobble effect that may cause noise, the EMI is equipped with a hydraulic conveyor system 600 (hydraulic clamping rollers 331, 332, and 333 in FIG. 3). The new system 300 can detect the longitudinal defects deeper than 12.5% pipe thickness, corresponding to the L4 level of the API-standard [7].

The disclosed flowchart for method 1500 and block diagrams 200-1300 illustrate the architecture, functionality, and operation of possible implementations of computer program products according to various aspects of controller of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, terms flaws mean pin-holes, cross cracks, lamination, seam cracks, butt welds, porosity, hook cracks, lack of fusion, edge damage, burned edges, and open seams that occur in the exterior and exterior surfaces as well as deeply buried defects inside test pipe. As used herein, the term test pipe and tubular products mean ferromagnetic tubing, wires, and oil country tubular goods (OCTG).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

REFERENCES

[1] P. C. R. Bhagi, Magnetic flux leakage technique: Basics, J. Non Destructive Test. Eval., vol. 11, pp. 7-17, December 2012.

[2] Hong Quang Pham, Quang Trung Trinh, Duy Tuan Doan, and Quang Hung Tran, Importance of magnetizing field on the magnetic flux leakage signal of defects, IEEE Transactions on Magnetics, vol 54, Number 6, page 6201206, June 2018.

[3] M. Coramik and Y. Ege, "Discontinuity inspection in pipelines: A comparison review," *Measurement*, vol. 111, pp. 359-373, December 2017.
[4] https://ndtsupply.com/emi-mfl/tubular-inspection-proucts.html
[5] Z. Y. Huang, P. W. Que, and L. Chen, "3D FEM analysis in magnetic flux leakage method", *NDT Int.*, vol. 39, no. 1, pp. 61-66, 2006.
[6] H. Q. Pham, V. S. Le, M. H. Vu, D. T. Doan, and Q. H. Tran, "Design of a lightweight magnetizer to enable a portable circumferential magnetic flux leakage detection system", Rev. Sci. Instrum. 90, 000000 (2019); doi: 10.1063/1.5090938.
[7] API Specification 5CT Eighth Edition, Jul. 1, 2005.
[8] https://www.tubularinspectionproducts.com/4-function-emi-units

DESCRIPTION OF NUMERALS

200 A simplified or conceptual EMI apparatus
201 test pipe (PUT)
202 longitudinal flaws parallel to the x-axis along the length of PUT
203 transverse flaws parallel to the y-axis along the circumference
210 transverse flaw detecting module
211 axial magnetizer
212 array of inspection probes
220 first longitudinal flaw detection module
221 first frame
222 first circumferential magnetizer
223 second circumferential magnetizer
224 first magnetic sensor array
225 second magnetic sensor array
230 second longitudinal flaw detection module
231 second rectangular frame
232 third circumferential magnetizer
233 fourth circumferential magnetizer
234 third magnetic sensor array
235 fourth magnetic sensor array
300 real-life and complete EMI apparatus of the present invention
310 base
320 adapting bed frame
331 first hydraulic clamping roller
332 second hydraulic clamping roller
333 third hydraulic clamping roller
340 transverse flaw detection module
350 first longitudinal flaw detection module
351 second longitudinal flaw detection module
400 base connected to adapting bed frame
410 base
411 corner hydraulic motors
412 middle hydraulic motor
420 adapting bed frame
431 divider for first hydraulic clamping roller
432 divider for second hydraulic clamping roller
433 divider for third hydraulic clamping roller
441 divider for transverse flaw detection module
451 divider for first longitudinal flaw detection module
452 divider for second longitudinal flaw detection module
500 hydraulic clamping roller
501 first stand
502 second stand
503 first pipe adapting slot
504 second pipe adapting slot
505 first vertical pivot pin
506 second vertical pivot pin
511 first rotating scissor extension
512 second rotating scissor extension
521 first conveyor roller
522 second conveyor roller
531 first hydraulic roller motor
532 second hydraulic roller motor
541 first hydraulic cylinder
542 second hydraulic cylinder
700 transverse flaw detection module
701 front disc of disc rotor
702 rear disc of disc rotor
703 annulus of disc rotor
704 Archimedean grooves
705 bobbin roll
706 support stand
707 magnetic winding coil
709 ballpoint bearing
710 actuator spindle
711 driver pulley
712 first anchor pulley
713 second anchor pulley
714 cable
715 pulley servo motor
720 sensor arm
721 first arm
722 second arm
722-1 shoe pad connector
723 pivot
724 first joint
725 second joint
726 shoe pad
727 safety wheel
731 top magnetic sensor array
732 bottom magnetic sensor arrays
900 layout of a row of sensor arrays
901 pick-up coils in array of four pick-up coils
902 pick-up coils in array of six pick-up coils
911 non-ferromagnetic layer
1000 first longitudinal flaw detection module
1001 square frame
1011 first screw arm
1012 first servo motor
1013 first safety wheel
1014 first shoe pad
1015 first magnetic sensor array
1021 second screw arm
1022 second servo motor
1023 second safety wheel
1024 second shoe pad
1025 second magnetic sensor array
1031 first ball screw spindle
1032 first magnetic coil
1033 first magnetizing coil
1034 first ball screw servo motor
1041 second ball screw spindle
1042 second magnetic coil
1043 second magnetizing coil
1044 second ball screw servo motor
1100 second longitudinal flaw detection module
1101 square frame
1111 third screw arm
1111-1 shoe pad connector
1112 third servo motor
1113 third safety wheel
1114 third shoe pad
1114-1 shoe pad connector 1115 third magnetic sensor array
1121 fourth screw arm
1121-2 opposite shoe pad connector
1122 fourth servo motor
1123 fourth safety wheel
1124 fourth shoe pad
1125 fourth magnetic sensor array
1131 third ball screw spindle
1132 third magnetic coil
1133 third magnetizing coil
1134 third ball screw servo motor
1141 fourth ball screw spindle
1142 fourth magnetic coil
1143 fourth magnetizing coil
1144 fourth ball screw servo motor
1200 2D layout of circumferential magnetic sensors
1201 top trapezium structure with steel wire brush
1202 bottom trapezium structure with steel wire brush
1210 elongated grooves
1211 top array of inductive pickup coils
1212 bottom array of inductive pickup coils
1221 opposite array of inductive pickup coils
1230 field of view perpendicular to axis 801
1400 controller system for stationary EMI apparatus
1401 pre-amplifier filter system and ADC unit
1402 keyboard panel
1403 display unit
1410 PLC board
1411 microprocessor (CPU)
1412 I/O circuitry
1413 memory
1420 mechatronic module
1421-1 first roller hydraulic motors and sensors control circuitry
1421-2 second roller hydraulic motors and sensors control circuitry
1421-3 third roller hydraulic motors and sensors control circuitry
1422 hydraulic cylinder and sensors control circuitry
1423 vertical hydraulic motors and sensors control circuitry
1424 sensor arm servo motors and sensors control circuitry
1425 1 & 2 crew arm servo motors & sensors control circuitry
1426 3 & 4 crew arm servo motors & sensors control circuitry
1427 1 &2 ball screw servo motors & sensors control circuitry
1428 3 & 4 ball screw servo motors & sensors control circuitry
1429 UART TTL to RS-232 conversion circuitry
1430 flaw detection module
1431 transverse flaw detection circuitry
1432 first longitudinal flaw detection circuitry
1433 second longitudinal flaw detection circuitry
1434 thickness variation monitoring circuitry
1441 analog communication channel
1442 UART serial communication channel

What is claimed is:

1. A stationary electromagnetic inspection (EMI) apparatus, comprising:
   a base;
   a plurality of hydraulic clamping rollers, connected to said base, operable to move a test pipe forward and backward in a linear direction only;
   a transverse flaw detection module comprising a plurality of sensor arms each equipped with an rows of magnetic sensor arrays arranged in a stagger manner along an axis of said test pipe;
   a first longitudinal flaw detection module comprising first magnetizers and first sensors; and
   a second longitudinal flaw detection module comprising second magnetizers and second sensors that are structurally the same and arranged orthogonal to said first magnetizers and said first sensors so as to generate transverse magnetic fields that cover the entire circumference without rotating said test pipe.

2. The stationary EMI apparatus of claim 1 wherein said first longitudinal flaw detection module is positioned directly next to said second longitudinal flaw detection module.

3. The stationary EMI apparatus of claim 2 wherein said first longitudinal flaw detection module further comprises:
   a first frame having a top side, a bottom side, a left side, and a right side;
   a first screw arm, located on said top side of said first frame, connected to be moved by a first servo motor;
   a first shoe pad connected to an end terminal of said first screw arm inside said first frame;
   a first plurality of magnetic sensor arrays deposited on a top surface of said first shoe pad;
   a second screw arm, located on said bottom side of said first frame, connected to be moved by a second servo motor;
   a second shoe pad connected to an end terminal of said second screw arm inside said first frame;
   a second plurality of magnetic sensor arrays deposited on a top surface of said second shoe pad;
   a first ball screw spindle located on said left side of said first frame;
   a first magnetizing coil coupled to said first ball screw spindle;
   a first magnetic pole coupled to said first magnetizing coil, operable to magnetize said test pipe;
   a second ball screw spindle located on said right side of said first frame;
   a second magnetizing coil coupled to said second ball screw spindle; and
   a second magnetic pole coupled to said second magnetizing coil, operable to magnetize said test pipe.

4. The stationary EMI apparatus of claim 3 wherein said second longitudinal flaw detection module further comprises:
   a second frame having a top side, a bottom side, a left side, and a right side;
   a third screw arm, located on said left side of said second frame, connected to be moved by a third servo motor;
   a third shoe pad connected at an end terminal of said third screw arm inside said second frame;
   a third plurality of magnetic sensor arrays deposited on a top surface of said third shoe pad;
   a fourth screw arm, located on said right side of said frame, connected to be moved by a fourth servo motor;
   a fourth shoe pad connected at an end terminal of said fourth screw arm inside said second frame;
   a fourth plurality of magnetic sensor arrays deposited on a top surface of said fourth shoe pad;
   a third ball screw spindle located on said top side of said second frame;
   a third magnetizing coil coupled to said third ball screw spindle;

a third magnetic pole coupled to said third magnetizing coil, operable to magnetize said test pipe;

a fourth ball screw spindle located on said bottom side of said second frame;

a fourth magnetizing coil coupled to said fourth ball screw spindle; and a fourth magnetic pole coupled to said fourth magnetizing coil, operable to magnetize said test pipe.

5. The stationary EMI apparatus of claim 4 wherein said first magnetic pole, said second magnetic pole, said third magnetic pole, and said fourth magnetic pole each comprises a trapezium with magnetic wire brush.

6. The stationary EMI apparatus of claim 5 wherein said first plurality of magnetic sensor arrays, said second plurality of magnetic sensor arrays each comprises at least four inductive pick-up coils.

7. The stationary EMI apparatus of claim 6 wherein said third plurality of magnetic sensor arrays and said fourth plurality of magnetic sensor arrays each further comprises at least four inductive pick-up coils which are arranged orthogonal to said first plurality of magnetic sensor array and said second magnetic sensor arrays.

8. The stationary EMI apparatus of claim 7 wherein said first plurality of magnetic sensor arrays, said second magnetic sensor arrays, said third magnetic sensor arrays, and said fourth magnetic sensor arrays each further comprises a first row of first four inductive pick-up coils and a second row of second row four inductive pick-up coils deposited next to and behind said first row of first four inductive pick-up coils along an axis of said test pipe, and wherein said first row of four inductive pick-up coils is arranged in stagger manner to said second row of four inductive pick-up coils.

9. The stationary EMI apparatus of claim 7 wherein said first row of four inductive pick-up coils and said second row of four inductive pick-up coils of said first plurality of magnetic sensor arrays are arranged in stagger manner with those of said second plurality of magnetic sensor arrays.

10. The stationary EMI apparatus of claim 9 wherein said first row of four inductive pick-up coils and said second row of four inductive pick-up coils of said third plurality of magnetic sensor arrays are arranged in stagger manner with those of said fourth plurality of magnetic sensor arrays.

11. The stationary EMI apparatus of claim 1 wherein said transverse flaw detection module further comprises:
a disc rotor having an annulus area and a circular opening at a center;
an actuator spindle coupled to said disc rotor; and
an array of sensor arms each having a first terminal and a second terminal, wherein said first terminal is coupled to said rows of magnetic sensor arrays arranged around a circumference of said circular opening of said disc rotor and said second terminal is coupled to be moved by said actual spindle.

12. The stationary EMI apparatus of claim 11 wherein said annulus area of said disc rotor having a plurality of Archimedean grooves mechanically coupled to said second terminal of each array of sensor arms.

13. The stationary EMI apparatus of claim 12 wherein said rows of magnetic sensor arrays further comprise a first array of four inductive pick-up coils, a second array of six inductive pick-up coils, a third array of four inductive pick-up coils, and a fourth array of six inductive pick-up coils; wherein said first array of four inductive pick-up coils is arranged behind said second array of six inductive pick-up coils and at the same position of said third array of four inductive pick-up coils which is in stagger manner with said fourth array of six inductive pick-up coils all in relation to said axis of said test pipe and said annulus area.

14. The stationary EMI apparatus of claim 13 and wherein said first array of four inductive pick-up coils is arranged opposite to and in stagger manner with said third array of four inductive pick-up coils and wherein said third array of six inductive pick-up coils is arranged opposite to and in stagger manner with said fourth array of six inductive pick-up coils.

15. The stationary EMI apparatus of claim 14 wherein each of said array of sensor arms further comprise a safety wheel connected to said first terminal and in a flush position with said a top surface of each of said rows of magnetic sensor arrays, operable to prevent said rows of magnetic sensor arrays from contacting with said test pipe.

16. The stationary EMI apparatus of claim 15 wherein each of said array of sensor arms further comprises a shoe pad having a front end and a rear end, wherein said front end is deposited with said magnetic sensor arrays and said rear end is coupled to said safety wheel and one of said Archimedean grooves.

17. The method of claim 16 wherein said step (a) of detecting said longitudinal defects further comprising firmly grasping said tubular product using a pair of rotating scissor extensions that are capable of adjusting their positions in accordance with a diameter of said test pipe.

18. The stationary EMI apparatus of claim 14 wherein each of said plurality of hydraulic clamping rollers further comprises:
a first foot stand;
a second foot stand;
a first rotating scissor extension member coupled to said first foot stand;
a second rotating scissor extension member coupled to said second foot stand;
a first conveyor roller coupled to be rotated by said first rotating scissor extension member and said second rotating scissor extension;
a second conveyor roller positioned below and aligned with said first conveyor roller, coupled to be rotated by said first rotating scissor extension member and said second rotating scissor extension;
a first roller motor coupled to rotate said first rotating scissor extension;
a second roller motor coupled to rotate said second rotating scissor extension;
a first hydraulic cylinder coupled to said first rotating scissor extension; and
a second hydraulic cylinder coupled to said second rotating scissor extension.

19. The method of claim 15 wherein said step (d) of moving said pipe further comprising varying a speed of said pipe in said translational direction.

20. A method of inspecting a tubular product, comprising:
(a) detecting longitudinal flaws on said tubular product using a first longitudinal defect detecting module placed directly adjacent to a second longitudinal defect detecting module; wherein said first longitudinal defect detecting module is characterized in internally containing first magnetizers and first magnetic sensor arrays arranged orthogonal to and structurally the same as second magnetizers and second magnetic sensor arrays internally to said second longitudinal defect detecting module so as to generate transverse magnetic fields that cover the entire circumference without rotating said tubular product;

(a) detecting transverse defects on said pipe using a transverse defect detecting module which is capable of adjusting the positions arrays of magnetic sensors at a constant distance and substantially parallel to an outer surface of said pipe using servo motors; and
(b) moving said tubular product in a linear direction only as said longitudinal defects and said transverse defects are performed from beginning to end of said tubular product.

* * * * *